United States Patent
Fukushima et al.

(10) Patent No.: US 6,360,150 B1
(45) Date of Patent: Mar. 19, 2002

(54) DEVICE FOR CONTROLLING YAWING OF VEHICLE

(75) Inventors: Naoto Fukushima; Etsuo Katsuyama, both of Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/462,436

(22) PCT Filed: May 7, 1999

(86) PCT No.: PCT/JP99/02371

§ 371 Date: Jan. 7, 2000

§ 102(e) Date: Jan. 7, 2000

(87) PCT Pub. No.: WO99/56994

PCT Pub. Date: Nov. 11, 1999

(30) Foreign Application Priority Data

May 7, 1998 (JP) ............................................. 10-124861

(51) Int. Cl.[7] .............................. B60T 8/32; B60T 8/00; B60K 28/16

(52) U.S. Cl. .............................. 701/41; 701/75; 701/83; 303/140

(58) Field of Search .............................. 701/41, 74, 75, 701/83, 72, 82; 303/140, 146; 318/587, 52, 586; 180/197

(56) References Cited

U.S. PATENT DOCUMENTS

| | | | | |
|---|---|---|---|---|
| 5,376,868 A | * | 12/1994 | Toyoda et al. ............... | 318/587 |
| 5,480,219 A | * | 1/1996 | Kost et al. ................... | 303/146 |
| 5,500,798 A | * | 3/1996 | Inagaki .................. | 364/424.05 |
| 5,710,704 A | * | 1/1998 | Graber ................. | 364/426.027 |
| 5,710,705 A | * | 1/1998 | Eckert ................. | 364/426.028 |
| 5,738,420 A | * | 4/1998 | Kawaguchi et al. ......... | 303/146 |
| 5,774,821 A | * | 6/1998 | Eckert .......................... | 701/78 |
| 5,899,952 A | * | 5/1999 | Fukada ........................ | 701/74 |

FOREIGN PATENT DOCUMENTS

| | | |
|---|---|---|
| JP | 3-70663 | 3/1991 |
| JP | 5-262156 | 10/1993 |

* cited by examiner

*Primary Examiner*—Tan Nguyen
*Assistant Examiner*—Dalena Tran
(74) *Attorney, Agent, or Firm*—Foley & Lardner

(57) ABSTRACT

Provided are a yaw moment generating mechanism a which produces a yawing motion at the vehicle, a vehicle behavior detection means b which detects a vehicle behavior, an actual yaw moment detection means a which is included in the vehicle behavior detection means b and detects an actual yaw moment acting on the vehicle, a target yaw moment arithmetic-calculation means d which calculates a target yaw moment necessary for a current vehicle behavior on the basis of an input from the vehicle behavior detection means b, and an operating command means e which operates the yaw moment generating mechanism to output a yaw moment equivalent to the difference between the target yaw moment and the actual yaw moment. Therefore, during the vehicle yaw dynamics control, it is possible to enhance the control quality without the control delay and control hunting and without giving the driver an uncomfortable feeling.

18 Claims, 21 Drawing Sheets

δ : FROM-WHEEL STEER ANGLE
ΔΨ : YAW RATE
ΔΔY : LATERAL ACCELERATION
β : SLIP ANGLE
C1 : FRONT-WHEEL CORNERING POWER (OF TWO FRONT ROAD WHEELS)
C2 : REAR-WHEEL CORNERING POWER (OF TWO REAR ROAD WHEELS)
m : MASS OF VEHICLE
I : MOMENT OF INERTIA OF VEHICLE
L : WHEEL BASE
V: VEHICLE SPEED

DEVICE FOR CONTROLLING YAWING OF VEHICLE

TECHNICAL FIELD

The invention relates to a vehicle yaw dynamics control system, capable of optimally controlling a vehicle yaw momentum during steering operation by applying a yawing moment to the vehicle by means of a control apparatus which performs a driving-force distribution control and/or a braking-force control for each of road wheels.

BACKGROUND ART

A conventional vehicle yaw dynamics control system has been disclosed in Japanese Patent Provisional Publication No. 5-262156.

The conventional system includes a driving-force distribution adjusting mechanism which distributes a driving force output from an engine of an automotive vehicle into left and right road wheels and adjusts torque-distribution between the left and right road wheels, a yaw rate sensor which detects an actual yaw rate of the automotive vehicle, a target yaw rate arithmetic-calculation means which arithmetically calculates a target yaw rate on the basis of input information, namely a steer-angle information data signal from a steer angle sensor and a vehicle-speed information data signal from a vehicle speed sensor, and a control means which controls the operation of the driving-force distribution adjusting mechanism. The control means is constructed in a manner so as to set a controlled hydraulic pressure applied to the driving-force distribution adjusting mechanism, while performing feed-back control so that the actual yaw rate is approached to the target yaw rate.

The previously-described conventional system has feedback-controlled so that the actual yaw rate is approached or adjusted to the target yaw rate. However, it is a somewhat delay time from the occurrence of a yaw moment applied to the vehicle after operation of the driving-force distribution adjusting mechanism to a time when the yaw moment generated is detected as a yaw rate by means of the yaw rate sensor. Thus, in performing the feedback control based on the actual yaw rate detected in a way as discussed above, as shown in FIG. 22(*b*), there is a risk or possibility of control delay.

Additionally, a differential calculus is made to obtain a controlled variable, thus resulting in increased oscillations and noises. In cooperation with the previously-noted control delay, as a result of the yaw dynamics control, the characteristic curve tends to oscillate, as shown in FIG. 23.

There is the problem that the driver feels uncomfortable in the presence of the above-mentioned undesired control delay or oscillations (hunting).

In addition, a yaw moment, acting on the vehicle, is dependent on a side force acting at a tire. The side force varies depending on a friction coefficient of a road surface (which will be hereinafter referred to as a "road-surface $\mu$"). The prior-art system could not execute a high-precision yaw control in due consideration of the road-surface $\mu$.

DISCLOSURE OF THE INVENTION

It is, therefore, in view of the previously-described disadvantages of the prior art, in controlling a yaw momentum acting on the vehicle, a principal object of the present invention to provide a vehicle yaw dynamics control system which is capable of enhancing the quality of yaw control without giving a driver an uncomfortable feeling, while eliminating the problem of the control delay or the occurrence of hunting during the yaw control. Furthermore, it is another object of the invention is to attain the previously-noted principal object, in spite of a low-cost yaw dynamics control system. It is a still further object of the invention is to highly enhance the quality of yaw control by performing the yaw control depending on the road-surface $\mu$.

In order to accomplish the aforementioned objects, as shown for example in the block diagram of FIG. 1, a vehicle yaw dynamics control system of the present invention, a yaw moment generating mechanism a which produces a yawing motion at the vehicle, a vehicle behavior detection means b which detects a vehicle behavior, an actual yaw moment detection means c which is included in the vehicle behavior detection means b and detects an actual yaw moment acting on the vehicle, a target yaw moment arithmetic-calculation means d which arithmetically calculates a target yaw moment necessary for a current vehicle behavior on the basis of the latest up-to-date input information being input from the vehicle behavior detection means b, and an operating command means e which operates the yaw moment generating mechanism to output a yaw moment equivalent to the difference between the target yaw moment and the actual yaw moment.

According to another aspect of the invention, in the vehicle yaw dynamics control system, the previously-noted vehicle behavior detection means b includes a side-force plus longitudinal-force detection means which detects a side force acting on each of road wheels and a longitudinal force acting on each of the road wheels, and the previously-noted actual yaw moment detection means a includes a means for arithmetically calculating the actual yaw moment on the basis of an input from the side-force plus longitudinal-force detection means.

According to aspect of the invention, in the vehicle yaw dynamics control system, the previously-noted vehicle behavior detection means b includes a yaw rate sensor which detects a yaw rate of the vehicle, and the previously-noted actual yaw moment detection means c includes a means for arithmetically calculating the actual yaw moment by multiplying a differentiated value of the yaw rate detected with a yaw moment of inertia of the vehicle.

According to another aspect of the invention, in the vehicle yaw dynamics control system, the previously-noted target yaw moment arithmetic-calculation means d includes a means for arithmetically calculating a target yaw rate by a steer angle and a quantity of state of the vehicle, and for arithmetically calculating the target yaw moment by multiplying the a differentiated value of the target yaw rate with a yaw moment of inertia of the vehicle.

According to another aspect of the invention, in the vehicle yaw dynamics control system, the previously-noted target yaw moment arithmetic-calculation means d includes a means for arithmetically calculating the target yaw moment by a quantity of state of each of the road wheels and a target tire characteristic.

According to another aspect of the invention, in the vehicle yaw dynamics control system, the previously-noted target yaw moment arithmetic-calculation means d includes a wheel load arithmetic-calculation means d1 which arithmetically calculates a wheel load of each of the road wheels, a wheel slip angle arithmetic-calculation means d2 which arithmetically calculates a slip angle of each of the road wheels, and a wheel braking-force/driving-force arithmetic-calculation means d3 which arithmetically calculates a wheel braking-force/driving-force, and the quantity of state of each of the road wheels comprises a wheel load, a slip angle, and a braking-force/driving-force.

According to another aspect of the invention, in the vehicle yaw dynamics control system, the previously-noted target yaw moment arithmetic-calculation means d includes a load-transfer arithmetic-calculation means d11 for arithmetically calculating a load transfer based on lateral acceleration, a slip-angle arithmetic-calculation means d12 for arithmetically calculating a slip angle of each of the road wheels, and an arithmetic-calculation means d13 for arithmetically calculating a target side force by only the load transfer and the slip angle of each of the road wheels, from the target tire characteristic, and for arithmetically calculating the target yaw moment on the basis of the target side force.

According to another aspect of the invention, in the vehicle yaw dynamics control system, the previously-noted actual yaw moment detection means c is constructed by a tire quantity-of-state estimation means c1 for estimating a quantity of state of each of tires of the road wheels, and an arithmetic-calculation means c2 for arithmetically calculating the yaw moment of the vehicle by an output signal from the tire quantity-of-state estimation means c1.

According to another aspect of the invention, in the vehicle yaw dynamics control system, the previously-noted vehicle behavior detection means b includes a lateral acceleration sensor, a longitudinal acceleration sensor, a brake sensor, a steer angle sensor, a yaw rate sensor, a vehicle speed sensor, and a vehicle slip angle detection means, and the tire quantity-of-state estimation means c1 for each of tires of the road wheels includes a wheel slip angle arithmetic-calculation means all for arithmetically calculating a slip angle of each of the road wheels on the basis of a vehicle slip angle, a steer angle, a yaw rate, and a vehicle speed, a wheel load arithmetic-calculation means c12 for arithmetically calculating a wheel load of each of the road wheels on the basis of a longitudinal acceleration acting in the longitudinal direction of the vehicle and a lateral acceleration acting in the lateral direction of the vehicle, a braking-force/driving-force arithmetic-calculation means c13 for arithmetically calculating a braking-force/driving-force acting on each of the road wheels on the basis of a braking condition and the longitudinal acceleration acting in the longitudinal direction of the vehicle, and a side force arithmetic-calculation means c14 for arithmetically calculating a side force on the basis of the wheel load of each of the road wheels, the braking-force/driving-force acting on each of the road wheels, and the slip angle of each of the road wheels, which data are obtained by way of these arithmetic-calculation means c11, c12, and c13.

According to another aspect of the invention, in the vehicle yaw dynamics control system, the previously-noted side force arithmetic-calculation means c14 includes a means for retrieving a side force acting on each of the road wheels on the basis of the wheel load and the slip angle except the braking-force/driving-force, from a preset characteristic map, a means for arithmetically calculating a side-force reduction rate on the basis of the braking-force/driving-force, and a means for arithmetically calculating the side force of each of the road wheels on the basis of the side force retrieved and the side-force reduction rate except the braking-force/driving-force.

According to another aspect of the invention, in the vehicle yaw dynamics control system, the previously-noted wheel slip angle arithmetic-calculation means d2 is constructed so that the slip angle of each of the road wheels is arithmetically calculated after a slip angle of the center of gravity of the vehicle is calculated in accordance with the following procedures. In calculating the slip angle B of the center of gravity of the vehicle, the wheel slip angle arithmetic-calculation means includes an arithmetic-calculation means for arithmetically calculating, first of all, a cornering-power estimate $PC_2$ of a rear wheel of the road wheels on the basis of signals from the respective sensors, namely a yaw-rate indicative signal $\Delta\psi$, a lateral acceleration indicative signal $\Delta\Delta Y$, and a vehicle speed indicative signal V, from the following expression (1).

$$PC_2=(V/L)(ma\Delta\Delta Y-I\Delta\psi s)s/[\Delta\psi(bs+V)-\Delta\Delta Y]+f(\Delta\Delta Y) \quad (1)$$

where s denotes a Laplace operator, m denotes a mass of the vehicle, a denotes a longitudinal distance from the center of gravity of the vehicle to a front-wheel axle, b denotes a longitudinal distance from the center of gravity of the vehicle to a rear-wheel axle, L denotes a wheel base, I denotes a moment of inertia of the vehicle, a first term of the right side of the expression is a rear-wheel cornering power calculated analytically from a two-wheel model of the vehicle, and a second term $f(\Delta\Delta Y)$ is a correction term based on the lateral acceleration. Second, the arithmetic-calculation means arithmetically calculates a slip angle $\beta$ by the rear-wheel cornering power estimate $PC_2$ and the yaw rate indicative signal $\Delta\psi$, from the following expression (2) representative of the relationship between the yaw rate calculated analytically from a two-wheel model of the vehicle, and the slip angle.

$$\beta=-K_{br}[(T_b s+1)/(T_r s+1)]\Delta\psi \quad (2)$$

where $K_{br}=(1-(ma/(LbPC_2))V^2)(b/V)$, $T_b=IV/(LbPC_2-maV^2)$, and $T_r=[ma/(LPC_2)]V$.

Alternatively, according to another aspect of the invention, in the vehicle yaw dynamics control system, the previously-noted wheel slip angle arithmetic-calculation means d2 is constructed so that the slip angle of each of the road wheels is arithmetically calculated after a slip angle of the center of gravity of the vehicle is calculated as follows. In calculating the slip angle of the center of gravity of the vehicle, the wheel slip angle arithmetic-calculation means includes an arithmetic-calculation means for arithmetically calculating, first of all, a cornering-power estimate $PC_2$ of a rear wheel of the road wheels on the basis of signals from the respective sensors, namely a yaw-rate indicative signal $\Delta\psi$, a lateral acceleration indicative signal $\Delta\Delta Y$, and a vehicle speed indicative signal V, from the following expression (5).

$$PC_2=(V/C)(ma\Delta\Delta Y-I\Delta\psi s)s/[\Delta\psi(bs+V)-\Delta\Delta Y] \quad (5)$$

where s denotes a Laplace operator, m denotes a mass of the vehicle, a denotes a longitudinal distance from the center of gravity of the vehicle to a front-wheel axle, b denotes a longitudinal distance from the center of gravity of the vehicle to a rear-wheel axle, L denotes a wheel base, and I denotes a moment of inertia of the vehicle. Second, the arithmetic-calculation means arithmetically calculates a slip angle $\beta$ by the rear-wheel cornering power estimate $PC_2$ and the yaw rate indicative signal $\Delta\psi$, from the following expression (6) representative of the relationship between the yaw rate calculated analytically from a two-wheel model of the vehicle, and the slip angle.

$$\beta=-K_{br}[(T_b s+1)/(T_r s+1)]\Delta\psi \quad (6)$$

where $K_{br}=(1-(ma/(LbPC_2))V^2)(b/V)$, $T_b=IV/(LbPC_2-maV^2)$, and $T_r=[ma/(LPC_2)]V$.

According to another aspect of the invention, in the vehicle yaw dynamics control system, the previously-noted target yaw moment arithmetic-calculation means d and the previously-noted actual yaw moment arithmetic-calculation means c respectively calculates the target side force and the actual side force, on the basis of the quantity of state of each of the road wheels and tire characteristics written as an arithmetic expression, and then arithmetically calculates the target yaw moment from the target side force and also calculates the actual yaw moment from the actual side force.

According to another aspect of the invention, in the vehicle yaw dynamics control system, an arithmetic expression for arithmetic-calculation of the actual side force Fsi performed by means of the previously-noted actual yaw moment arithmetic-calculation means c is as follows.

$$Fsi = Limit[\gamma i - (\gamma i^2/3) + (\gamma i^3/27)][(\mu Wi)^2 - Fai^2]^{1/2}$$

Additionally, in the previously-noted target yaw moment arithmetic-calculation means d, an arithmetic expression for arithmetic-calculation of the target side force $F^{\times}si$ is as follows.

$$F^{\times}si = \{Limit[\gamma^{\times}i - (\gamma^{\times}i^2/3) + (\gamma^{\times}i^3/27)] + A\beta i\}[(\mu Wi)^2 - BFai^2]^{1/2}$$

where the previously-noted $\gamma i$ means $\gamma i = |(Kc/\mu Wi) \tan \beta i|$, and the function $Limit[\gamma i-(\gamma i^2/3)+(\gamma i^3/27)]$ is a characteristic function that is saturated when a value within [ ] exceeds "1", and the above-mentioned character Wi denotes a wheel load of each road wheel, the above-mentioned character $\beta i$ denotes a side slip angle of each road wheel, the above-mentioned character Fai denotes a braking-force/driving-force, the above-mentioned character Kc denotes a cornering stiffness, the above-mentioned character $\mu$ denotes a friction coefficient between the tire and the road surface, the character A denotes a constant, and the character B denotes a longitudinal force correction factor. Also, $\gamma^{\times}i$ means $$\gamma^{\times}i = |(K^{\times}c/\mu Wi) \tan \beta i|,$$

and $K^{\times}c$ denotes a cornering stiffness.

According to another aspect of the invention, in the vehicle yaw dynamics control system, an arithmetic expression for arithmetic-calculation of the actual side force Fsi performed by means of the previously-noted actual yaw moment arithmetic-calculation means c is as follows. Fsi=D sin {C arctan[F−E(F−arctan(F))]} where each of C, D, E, and F is a function of $\mu$, Wi, and $\beta i$.

Additionally, an arithmetic expression for arithmetic-calculation of the target side force $F^{\times}si$ performed by means of the previously-noted target yaw moment arithmetic-calculation means d is as follows.

$$F^{\times}Si = D^{\times}\{sin\ [C^{\times}arctan[F^{\times}-E^{\times}(F^{\times}-arctan(F^{\times}))]] + Z\ \beta i\}$$

where each of $C^{\times}$, $D^{\times}$, $E^{\times}$, and $F^{\times}$ is a function of $\mu$, Wi, and $\beta i$, and Z is a constant.

According to another aspect of the invention, in the vehicle yaw dynamics control system, a road-surface friction coefficient detection means is provided for detecting a road-surface friction coefficient. The previously-noted actual yaw moment arithmetic-calculation means is constructed so that arithmetic-calculation for the actual yaw moment is varied depending on the road surface friction coefficient.

According to another aspect of the invention, in the vehicle yaw dynamics control system, a road-surface friction coefficient detection means is provided for detecting a road-surface friction coefficient. The previously-noted target yaw moment arithmetic-calculation means is constructed so that arithmetic-calculation for the target yaw moment is varied depending on the road surface friction coefficient.

According to another aspect of the invention, in the vehicle yaw dynamics control system, the previously-noted road surface friction coefficient detection means is constructed so that the road surface friction coefficient is estimated by a ratio of the longitudinal acceleration of the vehicle to the slip rate of a drive wheel.

According to another aspect of the invention, in the vehicle yaw dynamics control system, the road surface friction coefficient detection means is constructed so that the previously-noted road surface friction coefficient $\mu$ is derived from the following arithmetic expression, on the assumption that the previously-noted slip rate of the drive wheel is denoted by s, the tire stiffness is denoted by K, the driving force F is defined by an equation F=Ks, the longitudinal acceleration is denoted by Ax, and the vehicle weight is denoted by m.

$$\mu = (mAx/F) = (mAx/Ks)$$

According the system of the invention, during vehicle driving, the target yaw moment arithmetic-calculation means d arithmetically calculates a target yaw moment necessary for a current vehicle behavior, while the actual yaw moment detection means c detects an actual yaw moment actually acting on the vehicle. Additionally, the operating command means e operates the yaw moment generating mechanism a to output a yaw moment equivalent to the difference between the target yaw moment and the actual yaw moment.

In this manner, according to the invention, a desired value or target value and a detected value are both are derived as yaw moments, and then these values are compared to each other for yaw dynamics control, and whereby there is less delay in control results and oscillations (hunting).

DESCRIPTION OF THE PREFERRED EMBODIMENTS

Hereinafter explained is the embodiments of the present invention by reference to the drawings.

Before explaining the embodiments, the relationship among a steer angle $\delta$ of front road wheels, a yaw rate $\psi$, a cornering power C, and a side force is explained hereunder.

Figure 1:
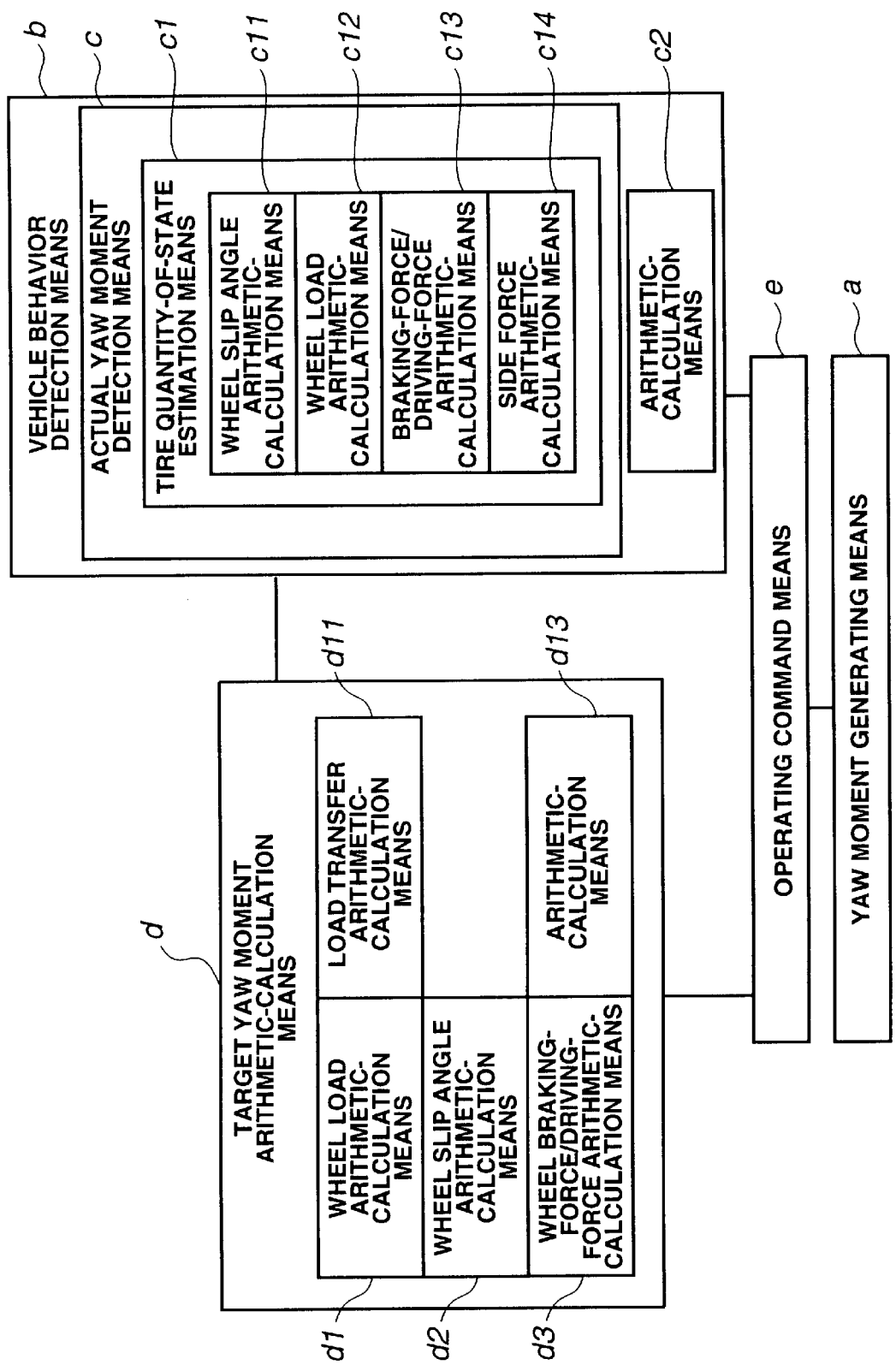
FIG. 1 is a block diagram corresponding to a main claim, illustrating a vehicle yaw dynamics control system of the invention.
Figure 2:
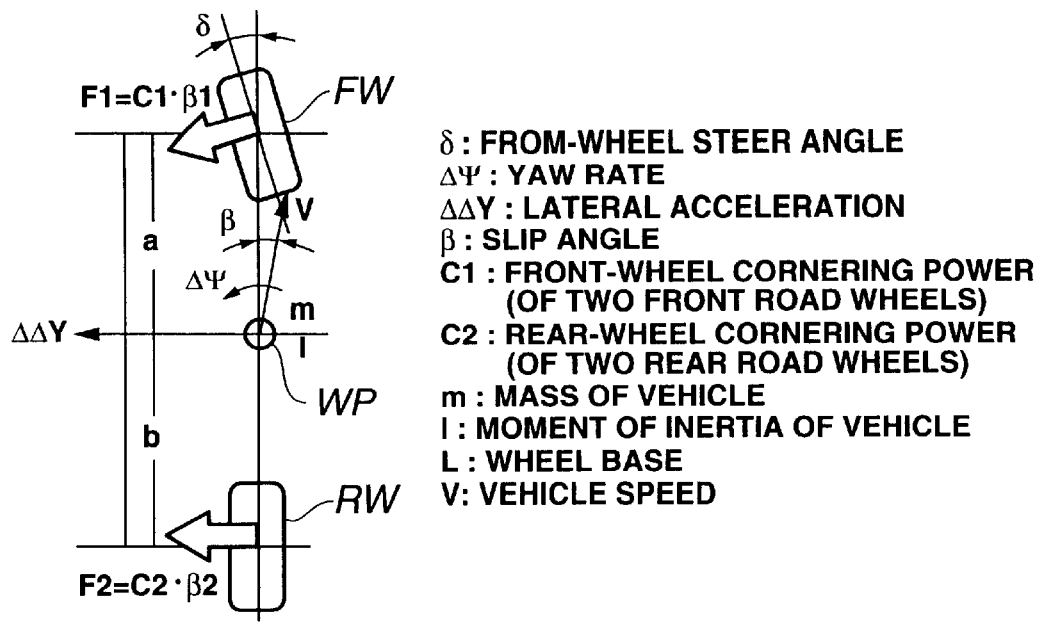
FIG. 2 is a diagram illustrating a two-wheel model.

FIG. 2 shows a two-wheel model used generally. In the drawing, FW denotes a front road wheel, RW denotes a rear road wheel, WP denotes a center of gravity of the vehicle, $\delta$ denotes a steer angle of the front road wheels, $\Delta\psi$ denotes a yaw rate, $\Delta\Delta Y$ denotes a lateral acceleration, $\beta$ denotes a slip angle, C1 denotes a front-wheel cornering power (of the two front road wheels), C2 denotes a rear-wheel cornering power (of the two rear road wheels), m denotes a mass of the vehicle, I denotes a moment of inertia of the vehicle, L denotes a wheel base, and V denotes a vehicle speed.

The equation of motion which defines the relationship between the yaw rate $\Delta\psi$ of the vehicle and the slip angle $\beta$, when the vehicle goes ahead at the vehicle speed V, is indicated by the following expressions (11) and (12).

$$mV(\Delta\beta+\Delta\psi)=-C1(\beta+a\Delta\psi/V-\delta)-C2(\beta-b\Delta\psi/V) \quad (11)$$

$$I\Delta\Delta\psi=-aC1(\beta+a\Delta\psi/V-\delta)+bC2(\beta-b\Delta\psi/V) \quad (12)$$

Figure 3:
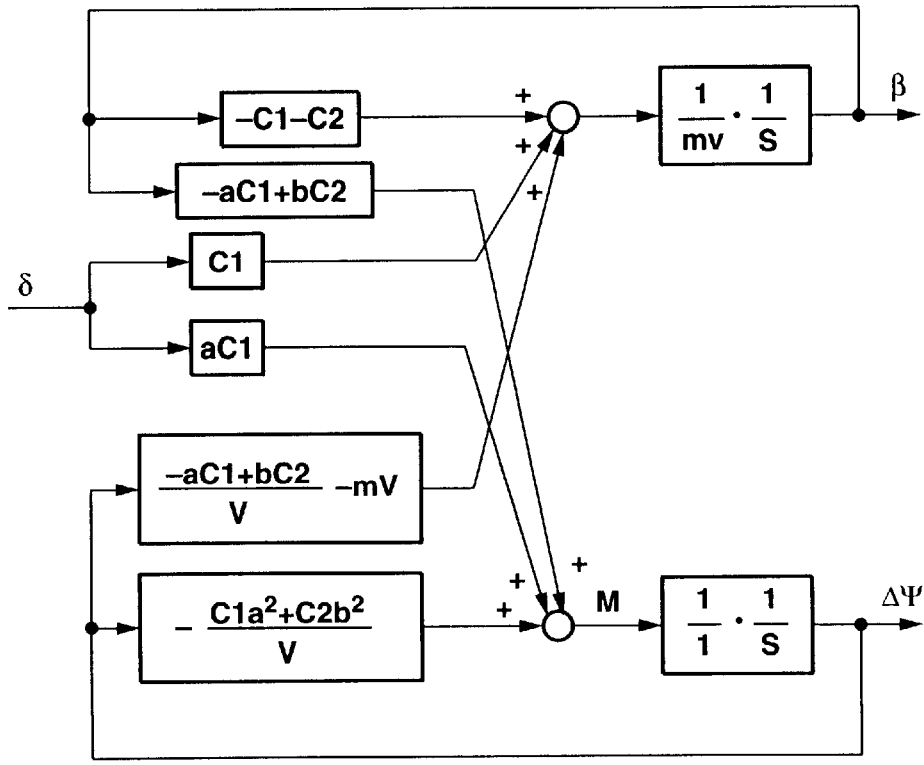
FIG. 3 is a block diagram illustrating a model of an equation of motion representative of the relationship among a front-wheel steer angle $\delta$, a slip angle $\beta$, and a yaw rate $\Delta\psi$.
Figure 4:
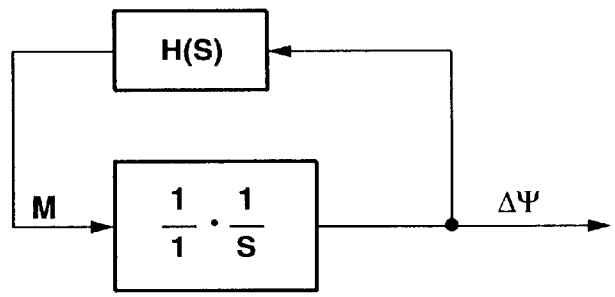
FIG. 4 is a schematic block diagram illustrating a model obtained by simplifying the previously-noted equation of motion.

FIG. 3 shows the block diagram indicating the state of response of the yaw rate $\Delta\psi$ and the slip angle $\beta$ with respect to the steer angle $\delta$, whereas FIG. 4 shows a simplified block diagram when the input of the steer angle is "0".

First Embodiment

Figure 5:
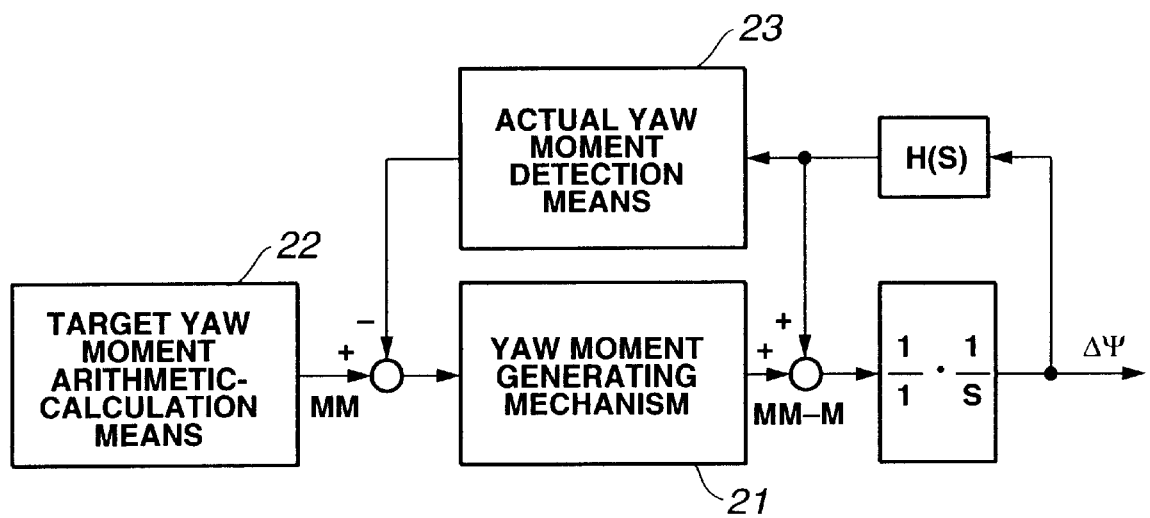
FIG. 5 is an explanatory view illustrating an embodiment.

Hereunder explained is the first embodiment. FIG. 5 is an explanatory view illustrating the construction and operation of the vehicle yaw dynamics control system of the first embodiment. In the drawing, reference sign 21 denotes a yaw moment generating mechanism which is constructed by a driving-force distribution mechanism disclosed in the previously-described prior art and a brake control system being controllable a braking force of each of the road wheels. Reference sign 22 denotes a target yaw moment arithmetic-calculation means which arithmetically calculates a target yaw moment MM suitable for the vehicle behavior. Reference sign 23 denotes an actual yaw moment detection means which detects an actual yaw moment M exerted on the vehicle. In the present embodiment, the actual yaw moment M, which is detected by the actual yaw moment detection means 23 and exerted on the vehicle, is compared with the target yaw moment MM, which is arithmetically calculated by the target yaw moment arithmetic-calculation means 22. The system of the embodiment is constructed so that the difference (MM−M) between them is generated by the yaw moment generating mechanism 21.

Figure 6:
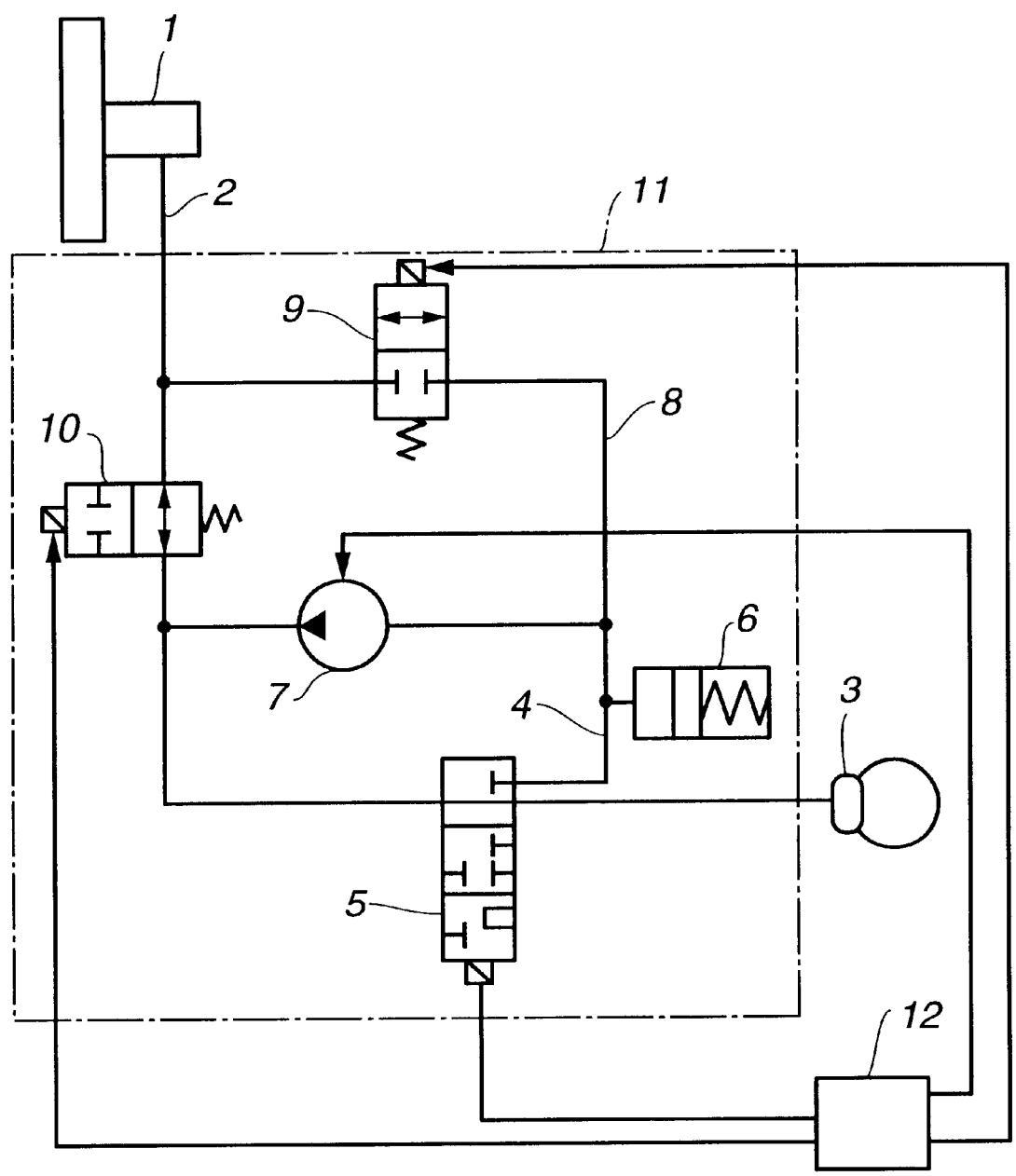
FIG. 6 is a general view illustrating a brake control system functioning as a yaw moment generating mechanism of the embodiment.

FIG. 6 shows a brake control system which is an example of the yaw moment generating mechanism 21. The brake control system has a generally-known construction, and thus the construction is briefly explained below. A master cylinder 1 and a wheel cylinder 3 are connected to each other via a brake circuit 2. A brake unit 11 is provided in the middle of the brake circuit 2.

The brake unit 11 is equipped with a switching valve which is capable of switching among three operating modes, namely a pressure built-up mode where the wheel cylinder 3 is connected to a side of the master cylinder 1, a pressure reduction mode where the wheel cylinder 3 is connected to a side of a drain circuit 4, and a pressure hold mode where the wheel cylinder 3 is shut off from both the master cylinder 1 and the drain circuit 4.

A reservoir 6 is disposed in the drain circuit 4. A pump 7 is also provided for returning brake fluid stored in the reservoir 6 into the brake circuit 2. Additionally, the drain circuit 4 and the master cylinder 1 are connected through a pressure apply circuit 8. An inflow gate valve 9 is also provided for opening and closing the pressure apply circuit 8. Additionally, an outflow gate valve is provided for opening and closing the brake circuit 2. A control unit 12 is also provided for controlling the operation of each of the valves 5, 9, and 10, and the operation of the pump 7.

In the brake control system as discussed above, under a condition where the master-cylinder pressure is not produced, during operation of the control unit 12, the inflow gate valve 9 is opened, while the outflow gate valve 10 is closed. In addition to the above, the pump 7 is driven. At this time, brake fluid in the master cylinder 1 is sucked in through the pressure apply circuit 8 by way of the pump 7, and then discharged into the brake circuit 2. A braking force can be produced by supplying the brake fluid discharged into the wheel cylinder 2, or by escaping the brake fluid fed into the wheel cylinder 3 into the reservoir 6 depending on the switching operation of the switching valve 5.

By arbitrarily producing such a braking force at the four road wheels, it is possible to generate a yaw moment on the vehicle. In the present embodiment, the brake unit 11 corresponds to the yaw moment generating mechanism. Part of the control unit 12 and sensors which is connected to the control unit 12 and described later, correspond to the previously-noted target yaw moment arithmetic-calculation means 22 and the actual yaw moment detection means 23.

Hereinafter described in detail the target yaw moment arithmetic-calculation means 22.

Figure 7:
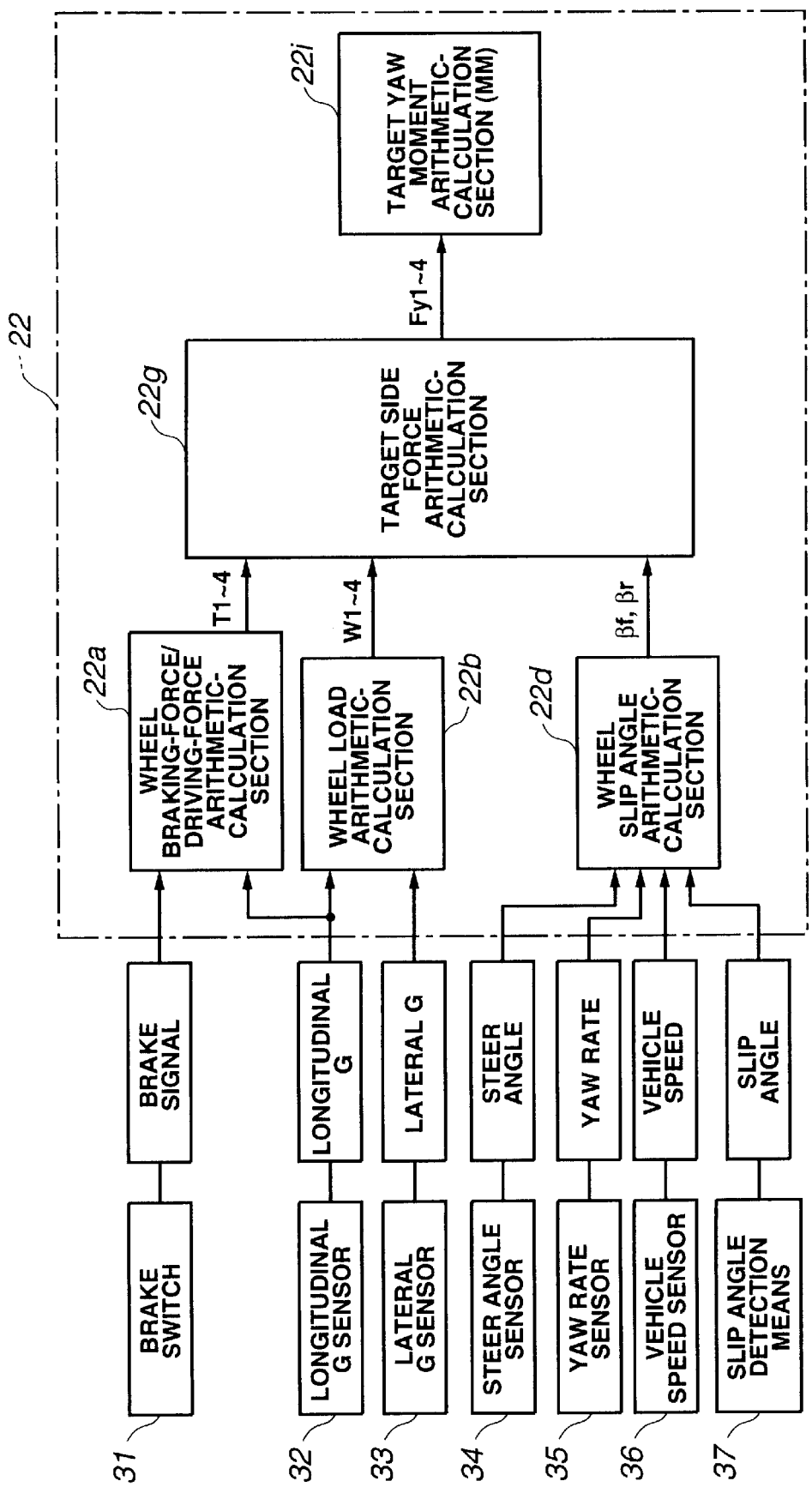
FIG. 7 is a block diagram illustrating a target yaw moment arithmetic-calculation means of the embodiment.

FIG. 7 is an explanatory view illustrating the target yaw moment arithmetic-calculation means 22. The target yaw moment arithmetic-calculation means 22 includes a wheel braking-force/driving-force arithmetic-calculation section 22a, a wheel load arithmetic-calculation section 22b, a wheel slip angle arithmetic-calculation section 22d, a target side force arithmetic-calculation section 22g, and a target yaw moment arithmetic-calculation section 22i. The target yaw moment arithmetic-calculation means is connected to input means, such as sensors which serve as vehicle behavior detection means and described later. Provided as these input means, are a brake switch 31 which is turned OFF usually and turned ON by the driver's braking action, a longitudinal G sensor 32 which detects longitudinal acceleration (which will be hereinafter referred to as "longitudinal G") acting on the vehicle in the longitudinal direction of the vehicle, a lateral G sensor 33 which detects lateral acceleration (which will be hereinafter referred to as "lateral G") acting on the vehicle in the lateral direction of the vehicle, a steer angle sensor 34 which detects a steer angle operated by the driver, a yaw rate sensor 35 which detects a yaw rate of the vehicle, a vehicle speed sensor 36 which detects vehicle speed, and a slip angle detection means 37 which detects a slip angle β of the vehicle.

The previously-noted wheel braking-force/driving-force arithmetic-calculation section 22a is provided for arithmetically calculating braking-force/driving-forces T1, T2, T3, and T4 acting on the respective four road wheels (T1 is a braking-force/driving-force acting on the front-left road wheel, T2 is a braking-force/driving-force acting on the front-right road wheel, T3 is a braking-force/driving-force acting on the rear-left road wheel, and T4 is a braking-force/driving-force acting on the rear-right road wheel). When the brake switch 31 is switched ON, the braking-force/driving-force acting on each road wheel is calculated on the assumption that a braking force corresponding to the longitudinal G sensed at this time is distributed in front and rear of the vehicle at a predetermined rate and the distributed braking force acts on each of the four road wheels. On the other hand, when the brake switch 31 is switched OFF, the braking-force/driving-force acting on each road wheel is calculated on the assumption that a braking force corresponding to the longitudinal G sensed at this time acts on the rear road wheels serving as drive wheels.

Concretely, the braking-force/driving-force of each road wheel is calculated on the basis of the following expressions, if a value of the signal from the brake switch 31 is indicated by Bsig, a value of the longitudinal G is indicated by ΔΔX, and the vehicle weight is indicated by m.

Bsig=0 (when the brakes are released (OFF))
T1=T2 =0
T3=T4=mΔΔX/2
Bsig=1 (when the brakes are applied (ON))
T1=T2=mΔΔX·(0.7/2)
T3=T4=mΔΔX·(0.3/2)

The wheel load arithmetic-calculation section 22b is provided for arithmetically calculating wheel loads W1, W2, W3, and W4 (exactly, W1 is a wheel load of the front-left road wheel, W2 is a wheel load of the front-right road wheel, W3 is a wheel load of the rear-left road wheel, and W4 is a wheel load of the rear-right road wheel) of the respective road wheels on the basis of the following expressions, depending on the longitudinal G, that is, ΔΔX, and the lateral G, that is, ΔΔY. In the following expressions, L denotes a wheel base, a longitudinal distance from a front-wheel axle to the center of gravity of the vehicle, b denotes a longitudinal distance from a rear-wheel axle to the center of gravity of the vehicle, and h denotes a height of the center of gravity.

W1=m(b/2L)−0.5 mΔΔX(h/L)−0.6 mΔΔYh/t
W2=m(b/2L)−0.5 mΔΔX(h/L)+0.6 mΔΔYh/t
W3=m(a/2L)+0.5 mΔΔX(h/L)−0.4 mΔΔYh/t
W4=m(a/2L)+0.5 mΔΔX(h/L)+0.4 mΔΔYh/t

The wheel slip angle arithmetic-calculation section 22d is provided for arithmetically calculating a front-wheel slip angle βf and a rear-wheel slip angle βr from the following expressions on the basis of the slip angle β of the center of gravity of the vehicle, utilizing a steer angle δ, the yaw rate Δψ, and the vehicle speed V.

βf=β−(Δψ/V)Lf+δ
βr=β−(Δψ/V)Lr where Lf denotes a longitudinal distance from the center of gravity of the vehicle to a front-wheel axle, and Lr denotes a longitudinal distance from the center of gravity of the vehicle to a rear-wheel axle.

The slip angle detection means 37 is a means for estimating a vehicle slip angle β on the basis of the yaw rate Δψ, the lateral G, that is, ΔΔY, and the vehicle speed V.

A way for such as estimation is explained hereunder. First, a cornering-power estimate $PC_2$ is arithmetically calculated by the following expression.

$$PC_2=(V/L)(maΔΔY−IΔψs)s/[Δψ(bs+V)−ΔΔY]+f(ΔΔY) \quad (21)$$

where s denotes a Laplace operator, m denotes a mass of the vehicle, a denotes a longitudinal distance from the center of gravity of the vehicle to a front-wheel axle, b denotes a longitudinal distance from the center of gravity of the vehicle to a rear-wheel axle, L denotes a wheel base, I denotes a moment of inertia of the vehicle, a first term of the right side of the expression is a rear-wheel cornering power calculated analytically from a two-wheel model of the vehicle, and a second term f(ΔΔY) is a correction term based on the lateral G.

Second, a slip angle (an estimate) β is arithmetically calculated by the rear-wheel cornering power estimate $PC_2$ and the yaw rate indicative signal Δψ, from the following expression (22) representative of the relationship between the yaw rate calculated analytically from a two-wheel model of the vehicle, and the slip angle.

$$β=−K_{br}[(T_bs+1)/(T_rs+1)]Δψ \quad (22)$$

where $K_{br}=(1−(ma/(LbPC_2))V^2)(b/V)$, $T_b=IV/(LbPC_2−maV^2)$, and $T_r=[ma/(LPC_2)]V$. Also, it is possible to define the previously-noted correction term f(ΔΔY) in the form of a linear expression of |ΔΔY| as indicated by the following expression (23).

$$f(ΔΔY)=C^*_2|ΔΔY|/9.8 \quad (23)$$

where $C^*_2$ is a gradient of the straight line interconnecting both a point where a side force of the rear tire and a side force on the characteristic diagram of the slip angle are almost saturated to each other, and an origin.

Alternatively, the lateral G value ΔΔY may be utilized in lieu of the yaw rate Δψ, and thus a slip angle (an estimate) β is arithmetically calculated from the following expression (24) representative of the relationship between the lateral G calculated analytically from a two-wheel model of the vehicle, and the slip angle β.

$$β=−K_{bg}[(T_bs+1)/(T_{g2}s^2+T_{g1}s+1)]ΔΔY \quad (24)$$

where $K_{bg}=(1−(ma/(LbPC_2))V^2)(b/V^2)$, $T_b=IV/(LbPC_2−maV^2)$, $T_{g2}=[I/(LPC_2)]$, and $T_{g1}=b/V$.

Furthermore, in lieu of the previously-described expression (21), a rear-wheel cornering power estimate $PC_2$ is arithmetically calculated from the following expression (31).

$$PC_2=(V/L)(ma\Delta\Delta Y-I\Delta\psi s)s/[\Delta\psi(bs+V)-\Delta\Delta Y] \quad (31)$$

where s denotes a Laplace operator, m denotes a mass of the vehicle, a denotes a longitudinal distance from the center of gravity of the vehicle to a front-wheel axle, b denotes a longitudinal distance from the center of gravity of the vehicle to a rear-wheel axle, L denotes a wheel base, and I denotes a moment of inertia of the vehicle.

In this case, in lieu of the previously-described expression (22), a slip angle β is arithmetically calculated from the following expression (32).

$$\beta=-K_{br}[(T_b s +1)/(T_r s+1)]\Delta\psi \quad (32)$$

where $K_{br}=(1-(ma/(LbPC_2))V^2)(b/V)$, $T_b=IV/(LbPC_2-maV^2)$, and $T_r=(ma/(LPC_2))V$.

Figure 8:
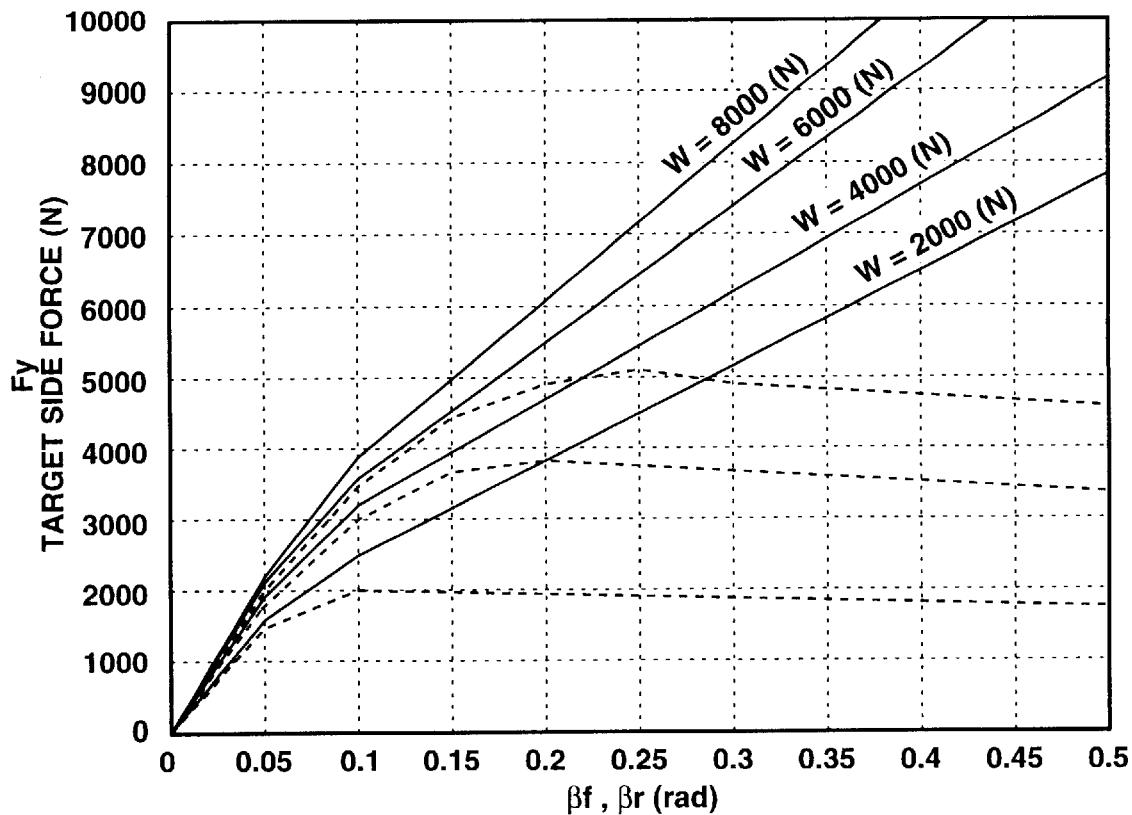
FIG. 8 is a characteristic diagram illustrating a map data needed to retrieve therefrom a target side force in the system of the embodiment.

The previously-noted target side force arithmetic-calculation section 22g is provided for arithmetically calculating or retrieving side forces Fy1, Fy2, Fy3, and Fy4 acting on the respective wheels, from the target tire-characteristic map shown in FIG. 8, on the basis of the wheel loads W1 to W4, and the slip angles βf and βr of the front and rear road wheels. The characteristic curves indicated by the solid line in FIG. 8, are target tire characteristics which are preset or preprogrammed as ideal tire characteristics. That is to say, as indicated by the broken lines, in accordance with the actual tire characteristics, the side force F hits the peak, as the slip angles βf and βr increase. In contrast to the above, in accordance with the ideally-set target tire characteristics, the side force F is set to become greater, as the slip angles βf and βr increase. That is, a higher cornering force can be obtained according to the increase in each of the slip angles.

The previously-noted target yaw moment arithmetic-calculation section 22i is provided for arithmetically calculate the target yaw moment MM from the following expression, on the basis of the respective target side forces Fy1 to Fy4.

$$MM=(Fy1+Fy2)a-(Fy3+Fy4)b$$

Figure 9:
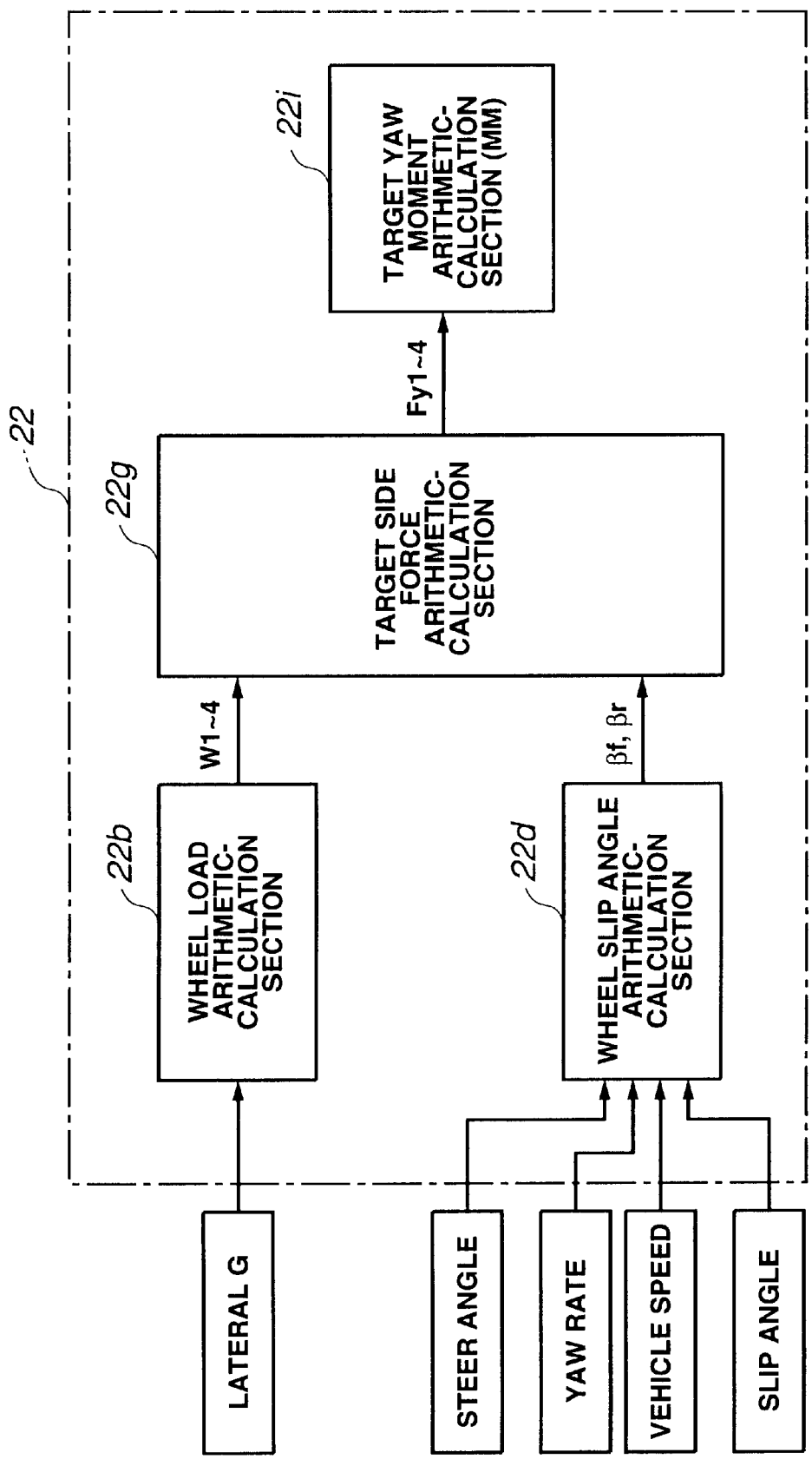
FIG. 9 is a block diagram illustrating the other example of the target yaw moment arithmetic-calculation means.

On the other hand, FIG. 9 shows another example of the target yaw moment arithmetic-calculation means 22. According to this example, the wheel load arithmetic-calculation section 22c arithmetically calculates a load transfer on the basis of the lateral G. Depending upon the calculated load transfer and the slip angles βf and βr of each of the road wheels, calculated by the wheel slip angle arithmetic-calculation section 33d, the target side forces Fy1 to Fy4 are arithmetically calculated or retrieved from the preset target tire characteristics, by means of the target side force arithmetic-calculation section 22g. The side force that takes load transfer into account, may be obtained on the basis of the slip angles βf and βr and the wheel load W, for example by means of a first side force arithmetic-calculation section 23f of an actual yaw moment detection means 23, which will be fully described later.

Alternatively, it is possible to arithmetically calculate the target yaw moment as follows.

$$MM=i(d\Delta\psi_1/dt)=(I/L)(\Delta\delta V+\delta\Delta V)$$

where $\Delta\psi_1$ denotes a target yaw rate, I denotes a moment of inertia of the vehicle, L denotes a wheel base, δ denotes a steer angle, and Δδ denotes a steering velocity.

Figure 10:
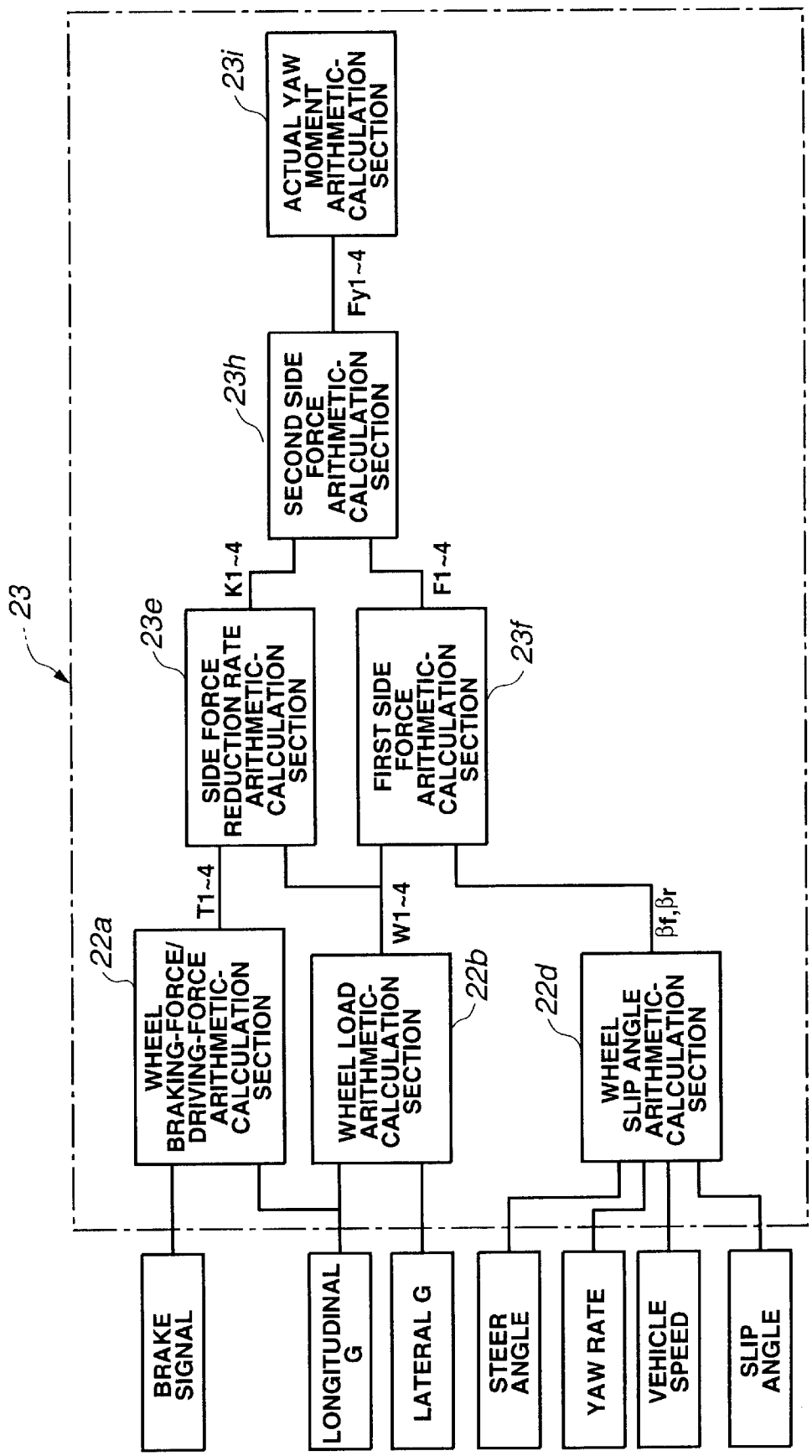
FIG. 10 is a block diagram illustrating an actual yaw moment detection means of the embodiment.

Hereunder explained is the previously-noted actual yaw moment detection means 23. As shown in FIG. 10, the vehicle yaw moment detection means 23 includes a wheel braking-force/driving-force arithmetic-calculation section 22a, a wheel load arithmetic-calculation section 22b, a wheel slip angle arithmetic-calculation section 22d, a side force reduction rate arithmetic-calculation section 23e, the first side force arithmetic-calculation section 23f, a second side force arithmetic-calculation section 23h, and an actual yaw moment arithmetic-calculation section 23i. Hereupon, the wheel braking-force/driving-force arithmetic-calculation section 22a, the wheel load arithmetic-calculation section 22b, and the wheel slip angle arithmetic-calculation section 22d are the same elements as previously explained about the target yaw moment arithmetic-calculation means 22, and thus detailed description of these elements will be omitted because the above description thereon seems to be self-explanatory.

The previously-noted side force reduction rate arithmetic-calculation section 23e is provided for arithmetically calculate side force reduction rates k1, k2, k3, and k4 (k1 denotes a side force reduction rate of the front-left road wheel, k2 denotes a side force reduction rate of the front-right road wheel, k3 denotes a side force reduction rate of the rear-left road wheel, and k4 denotes a side force reduction rate of the rear-right road wheel) from the following expressions, on the basis of the braking-force/driving-forces T1 to T4 of the respective road wheels, calculated by the wheel braking-force/driving-force arithmetic-calculation section 22a and the wheel loads W1 to W4, calculated by the wheel load arithmetic-calculation section 22b.

$k1=(W1^2-T1^2)^{1/2}/W1$
$k2=(W2^2-T2^2)^{1/2}/W2$
$k3=(W3^2-T3^2)^{1/2}/W3$
$k4=(W4^2-T4^2)^{1/2}/W4$

Figure 11:
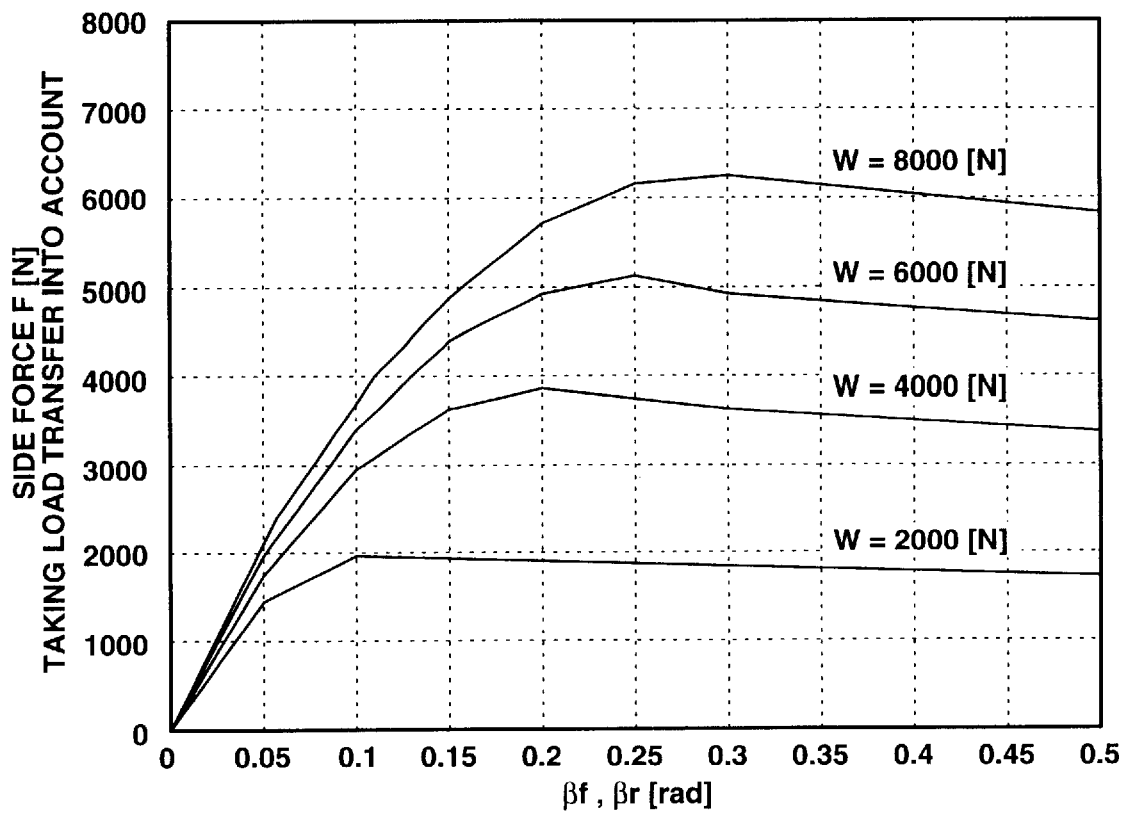
FIG. 11 is a characteristic diagram illustrating a map data needed to retrieve therefrom a side force in the system of the embodiment.

The previously-noted first side force arithmetic-calculation section 23f is provided for arithmetically calculating a side force F that taking load transfer into account. The side force acting on each of the road wheels is arithmetically calculated or retrieved from the characteristic map shown in FIG. 11, on the basis of the wheel load W, the slip angles βf and βr. The first side force arithmetic-calculation section is constructed so that a value interpolated between the map data can be retrieved even when the wheel load W is an arbitrary value.

The previously-noted second side force arithmetic-calculation section 23h is provided for arithmetically calculating the side forces Fy1, Fy2, Fy3, and Fy4 (Fy1 denotes a side force of the front-left road wheel, Fy2 denotes a side force of the front-right road wheel, Fy3 denotes a side force of the rear-left road wheel, and Fy4 denotes a side force of the rear-right road wheel) acting on the respective road wheels from the following expressions, on the basis of the side force reduction rate of each of the road wheels and the side force F of each road wheel that takes load transfer into account.

Fy1=k1·F1
Fy2=k2·F2
Fy3=k3·F3
Fy4=k2·F4

The previously-noted actual yaw moment arithmetic-calculation section 23i is provided for arithmetically calculating the actual yaw moment M acting on the vehicle owing to the side forces Fy1 to Fy4 acting on the respective road wheels, from the following expression.

$$M=(Fy1+Fy2)a-(Fy3+Fy4)b$$

Figure 12:
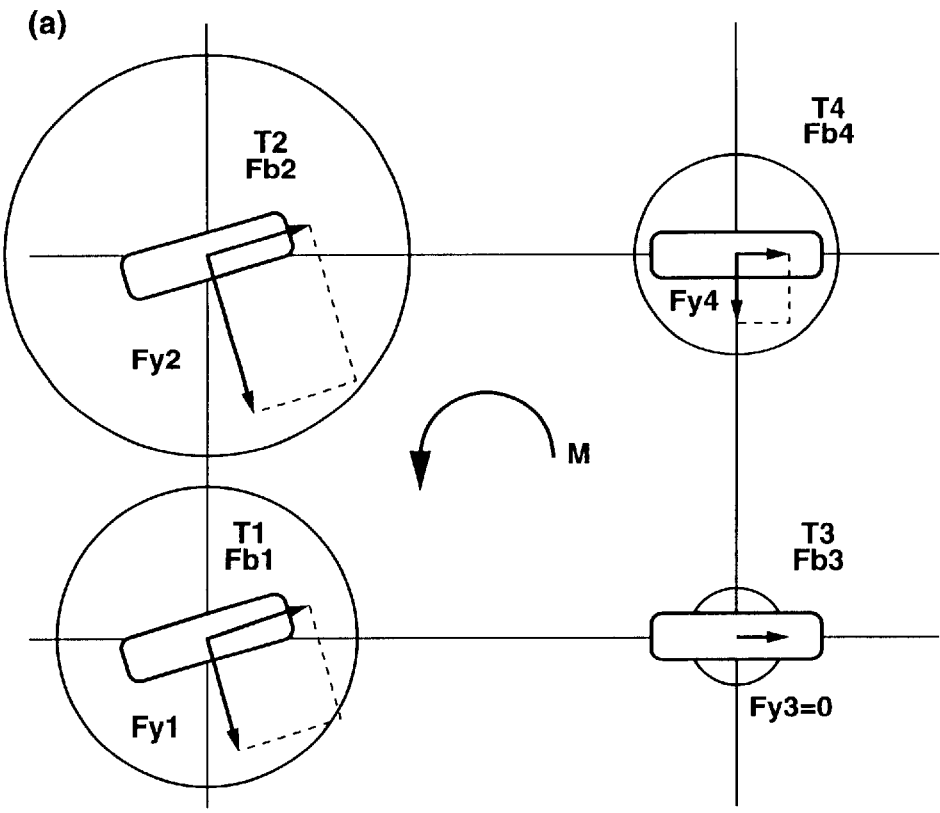
FIG. 12 is an explanatory view illustrating an example of the operation of the system of the embodiment.
Figure 12:
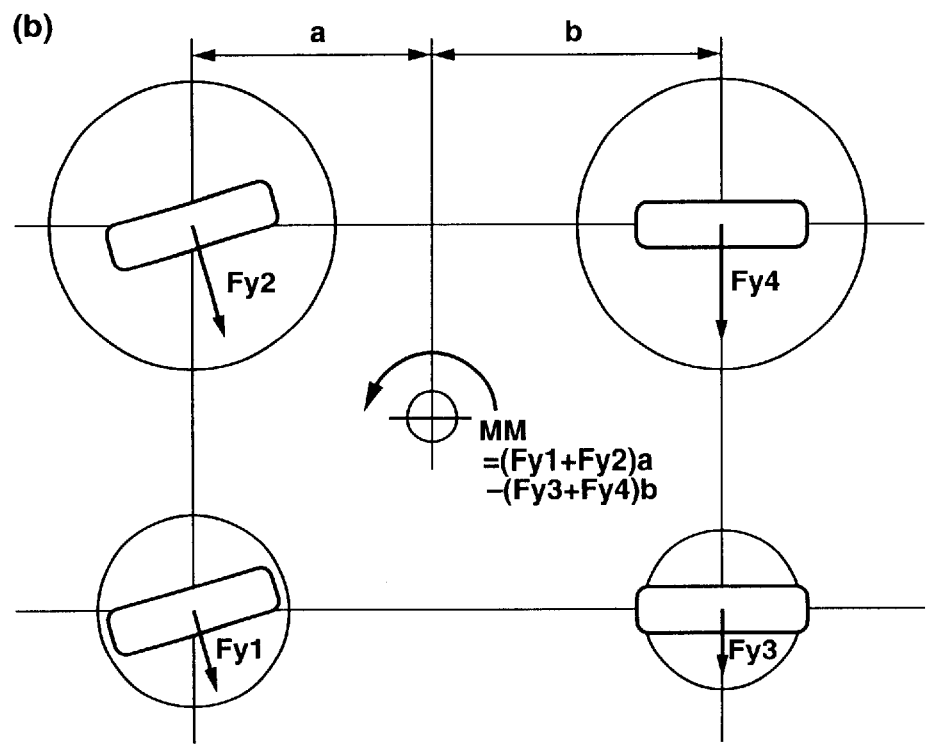

FIG. 12 shows an example of the operation of this embodiment. In the drawing, (a) shows a case that the brakes are applied while turning to the left and thus the actual yaw moment M occurs. In this case, the load tends to transfer to the front wheel side and to the right-hand side. As shown in the drawing, the front-wheel-side braking-force/driving-force (T1, T2) tends to become greater than the rear-wheel-side braking-force/driving-force (T3, T4). As a result of this, in comparison with the rear-wheel-side side force (Fy3, Fy4), the front-wheel-side side force (Fy1, Fy2) becomes greater. In such a case, there is the occurrence of great side force Fy2 at the front-right road wheel, whereas there is no occurrence of side force Fy3 at the rear-left road wheel. That is, the vehicle experiences a so-called oversteer state.

In the presence of such a vehicle behavior, the actual yaw moment detection means 23 arithmetically calculates the side forces Fy1 to Fy4 of the respective road wheels on the basis of input signals from the sensors 31 to 36 and the slip angle detection means 37, serving as the input means, and then calculates the actual yaw moment M on the basis of the calculated side forces. On the other hand, the target yaw moment arithmetic-calculation means 22 arithmetically calculates the side forces Fy1 to Fy4 needed to obtain the ideal, target tire characteristics, on the basis of the input information from the input means 31 to 37, and then calculates the target yaw moment MM on the basis of the calculated side forces. As regards the target side forces Fy1 to Fy4 and the target yaw moment MM, calculated by the target yaw moment arithmetic-calculation means 22, as shown in FIG. 12(b), outer-wheel-side side force (Fy2, Fy4) becomes greater in comparison with the inner-wheel-side side force (Fy1, Fy3), and also the magnitude of side force is same in front and rear of the vehicle. This provides neutral steer characteristics.

Therefore, the yaw moment generating mechanism 21 generates such a braking-force/driving-force that the target yaw moment MM is obtained, that is, a yaw moment corresponding to the difference between the actual yaw moment M and the target yaw moment MM.

Figure 13:
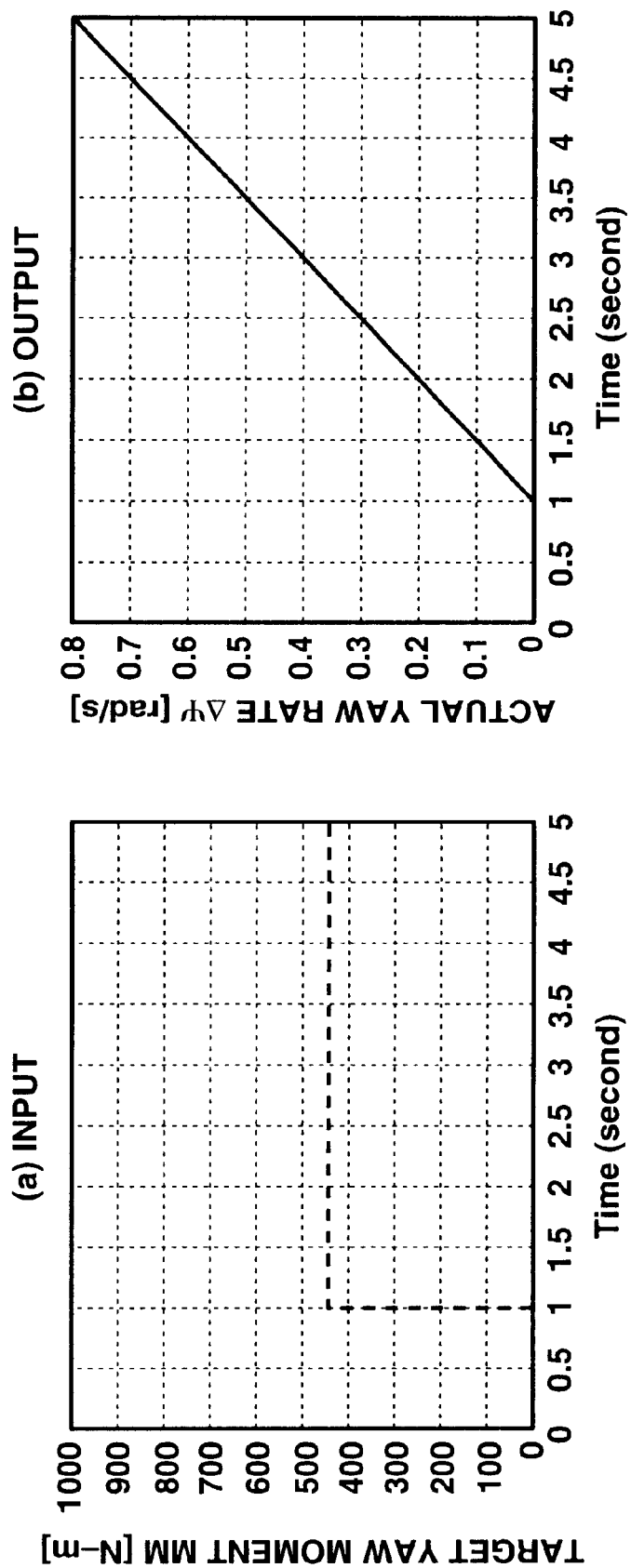
FIG. 13 is an input/output characteristic diagram illustrating an example of the operation of the system of the embodiment.
Figure 22:
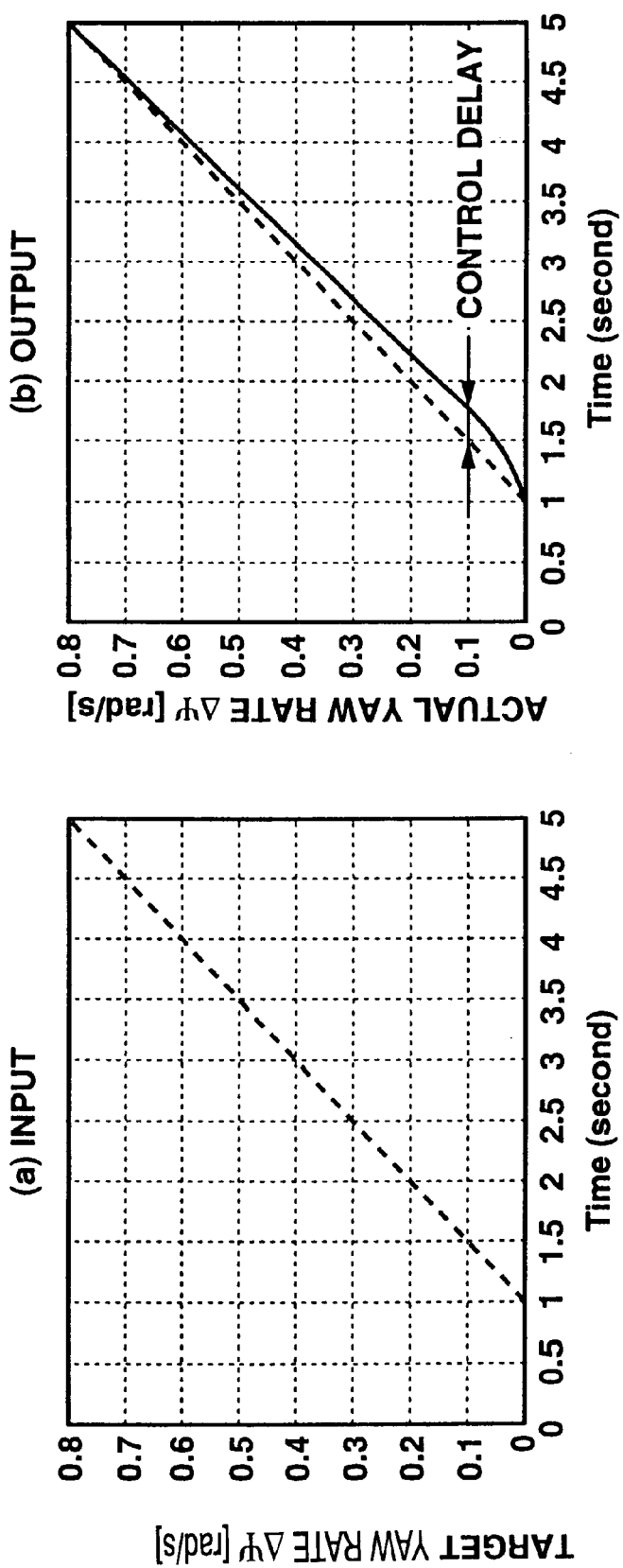
FIG. 22 is an input/output characteristic diagram illustrating an example of the operation of the prior art.
Figure 23:
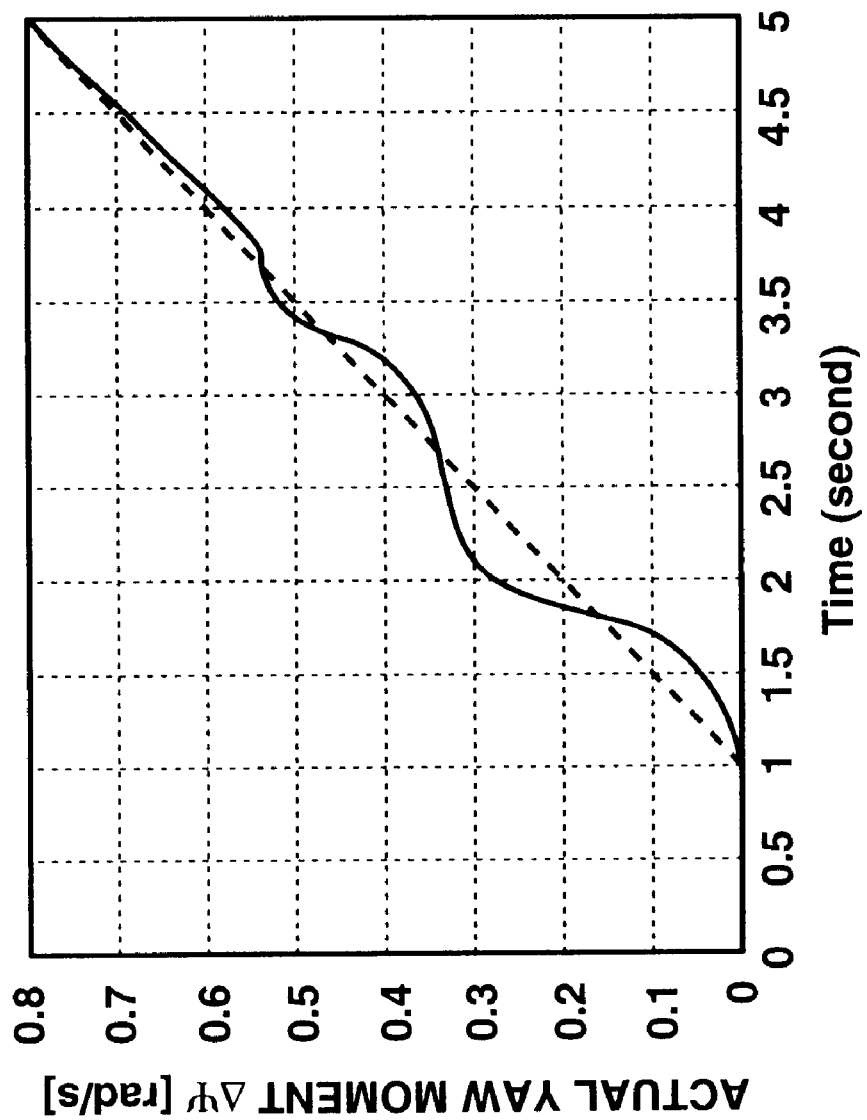
FIG. 23 is an output characteristic diagram illustrating an example of the operation of the prior art.

In this manner, when the control is executed so that the actual yaw moment M is detected, the target yaw moment MM is arithmetically calculated, and then the yaw moment corresponding to the difference between them is generated, as shown in FIG. 13, it is possible to generate the actual yaw rate $\Delta\psi$ without time delay. On the other hand, FIG. 22 shows a case that the control is executed on the basis of the target yaw rate. In this case, as shown in (b) of the same drawing, there is the delay in control.

As explained above, according to this embodiment, the actual yaw moment is detected, and additionally the target yaw moment is arithmetically calculated, and then the control is performed so that a yaw moment corresponding to the difference between them is generated, and whereby there is no possibility of the control delay, and also there is no occurrence of oscillations (control hunting). Thus, the yaw control can be performed without giving the driver an uncomfortable feeling, and the system provides such an effect that the quality of yaw control is enhanced.

Additionally, in executing the previously described control, the existing sensors 31 to 36 are merely used as the input means. Therefore, there is no need for addition of a new sensor such as a load sensor for the purpose of calculation of side force acting on the road wheel. Thus, the system has an effect on reduced manufacturing costs.

Second Embodiment

Hereunder described in detail is the second embodiment. The same reference signs used to designate elements in the first embodiment will be applied to the corresponding elements used in the second embodiment, and thus detailed description of these elements will be omitted because the above description thereon seems to be self-explanatory.

Figure 14:
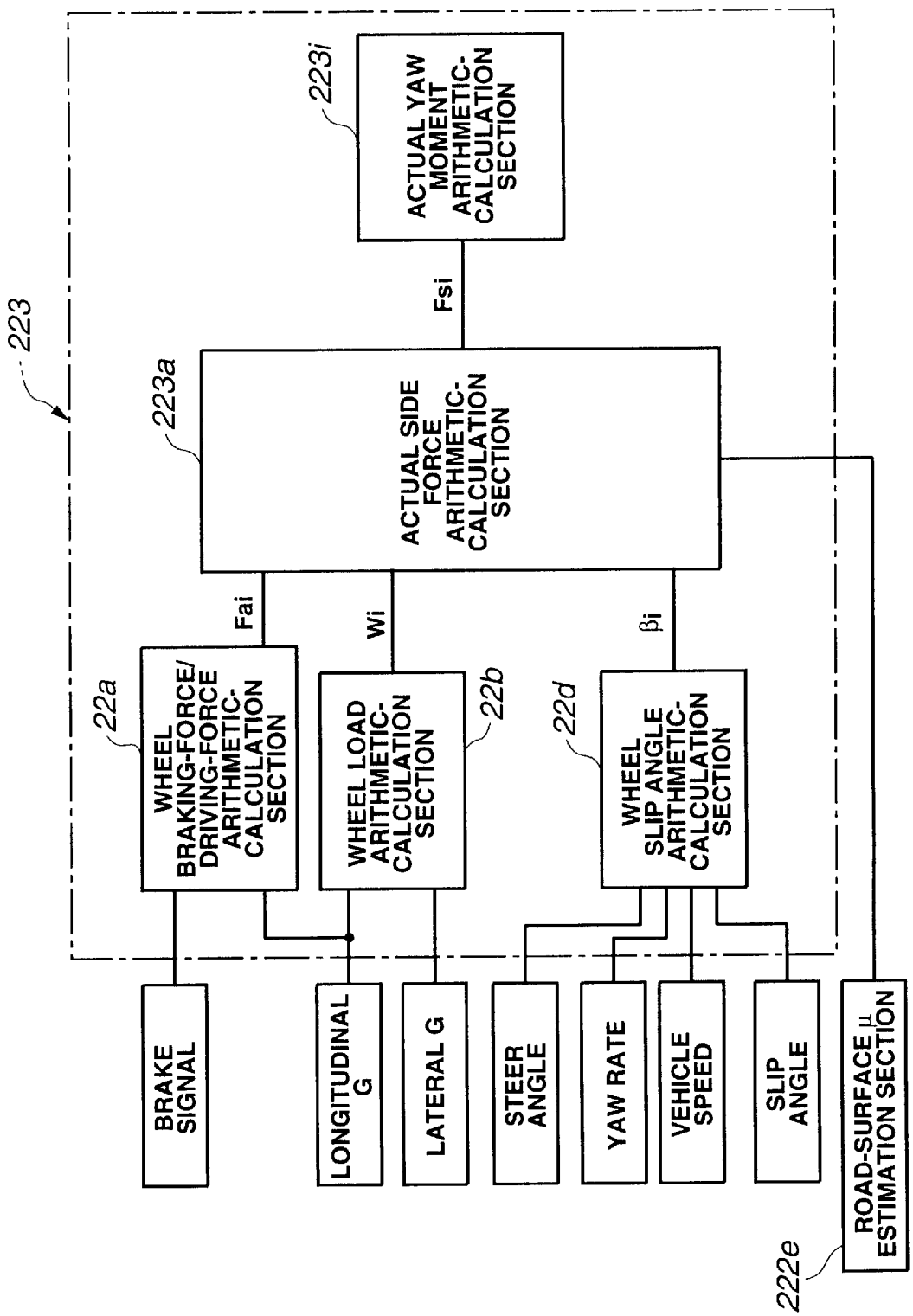
FIG. 14 is a block diagram illustrating an actual yaw moment detection means of a second embodiment.

FIG. 14 shows an actual yaw moment detection means 223 of the second embodiment. The output signals from the wheel braking-force/driving-force arithmetic-calculation section 22a, the wheel load arithmetic-calculation section 22b, the wheel slip angle arithmetic-calculation section 22d, a road-surface $\mu$ estimation section 222e are input into an actual side force arithmetic-calculation section 223a. That is, the actual side force arithmetic-calculation section 223a stores the following arithmetic expression needed to calculate an actual side force Fsi of the tire.

$$Fsi = Limit[\gamma i - (\gamma i^2/3) + (\gamma i^3/27)][(\mu W)^2 - Fai^2]^{1/2}$$

where $\gamma i = |(Kc/\mu Wi) \tan \beta i|$, and the function $Limit[\gamma i - (\gamma i^2/3) + (\gamma i^3/27)]$ is a characteristic function that is saturated when a value within [ ] exceeds "1", and the above-mentioned character Wi denotes a wheel load of each road wheel, the above-mentioned character $\beta i$ denotes a slip angle of each road wheel, the above-mentioned character Fai denotes a braking-force/driving-force, the above-mentioned character Kc denotes a cornering stiffness, the above-mentioned character $\mu$ denotes a friction coefficient between the tire and the road surface.

Figure 15:
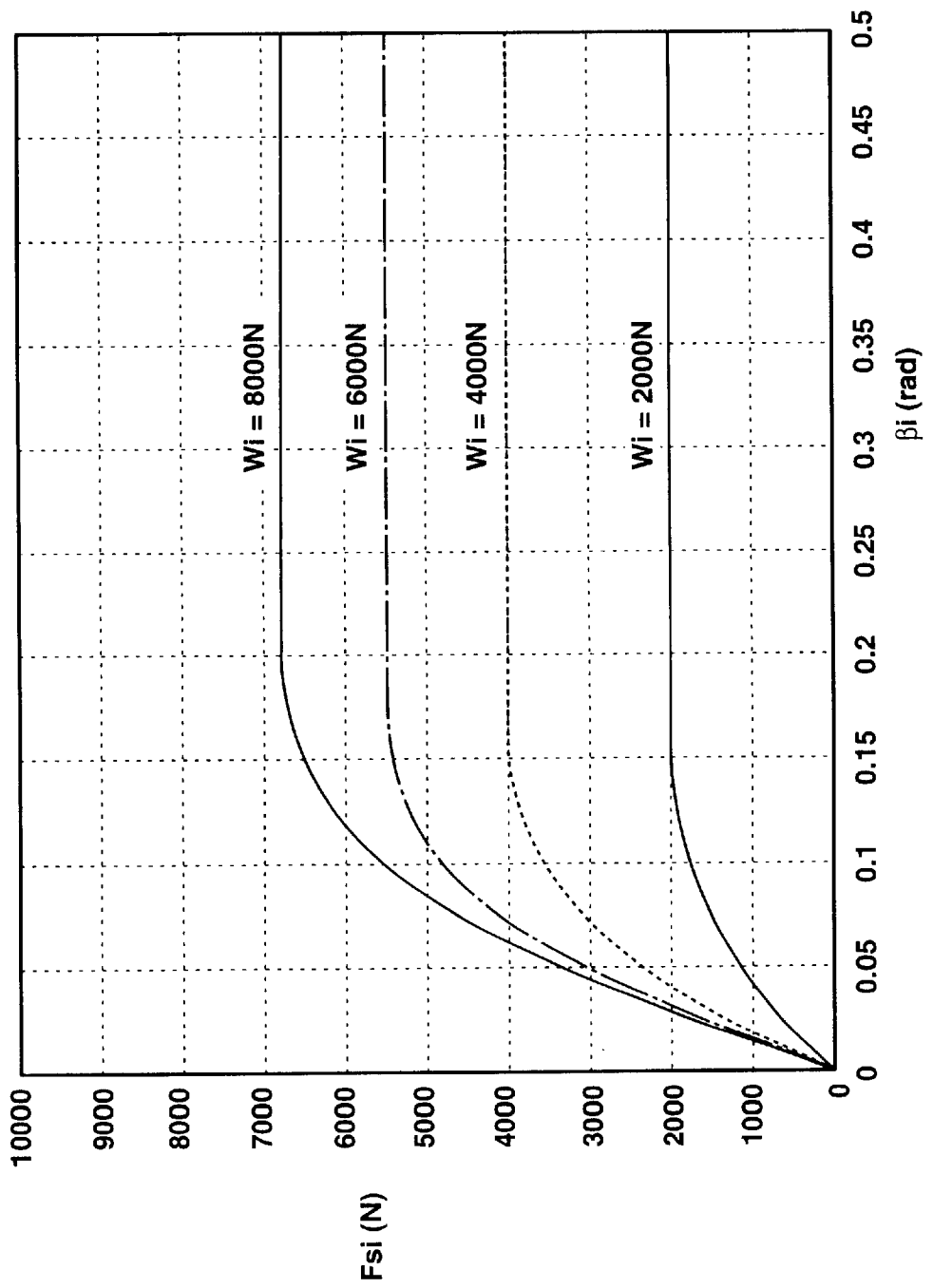
FIG. 15 is a characteristic diagram illustrating an actual side force in the system of the second embodiment.

FIG. 15 is the characteristic diagram illustrating the relationship among the wheel load Wi, the wheel slip angle $\beta i$, and the actual side force Fsi.

In the shown embodiment, the road-surface $\mu$ estimation section 222e arithmetically calculates the road-surface friction coefficient from an arithmetic expression $\mu = mAx/F = mAx/Ks$, where m is the vehicle weight, Ax is the longitudinal acceleration, K is a tire stiffness, and s is a slip rate of the drive wheel. The slip rate s of the drive wheel is calculated from an arithmetic expression $s = (Vr - Vx)/Vx$, where Vx is the vehicle-body speed, and Vr is an average speed of the rear-left and rear-right road wheels (drive wheels).

Therefore, the actual side force arithmetic-calculation section 223a receives input signals respectively indicative of braking-force/driving-force Fai, the wheel load Wi, the wheel slip angle $\beta i$, and the road-surface friction coefficient $\mu$ from the wheel braking-force/driving-force arithmetic-calculation section 22a, the wheel load arithmetic-calculation section 22b, the wheel slip angle arithmetic-calculation section 22d, and the road-surface $\mu$ estimation section 222e, and then calculates the actual side force Fsi by way of the above-mentioned arithmetic expression. The actual yaw moment arithmetic-calculation section 223i arithmetically calculates the actual yaw moment M on the basis of the actual side force Fsi.

Figure 16:
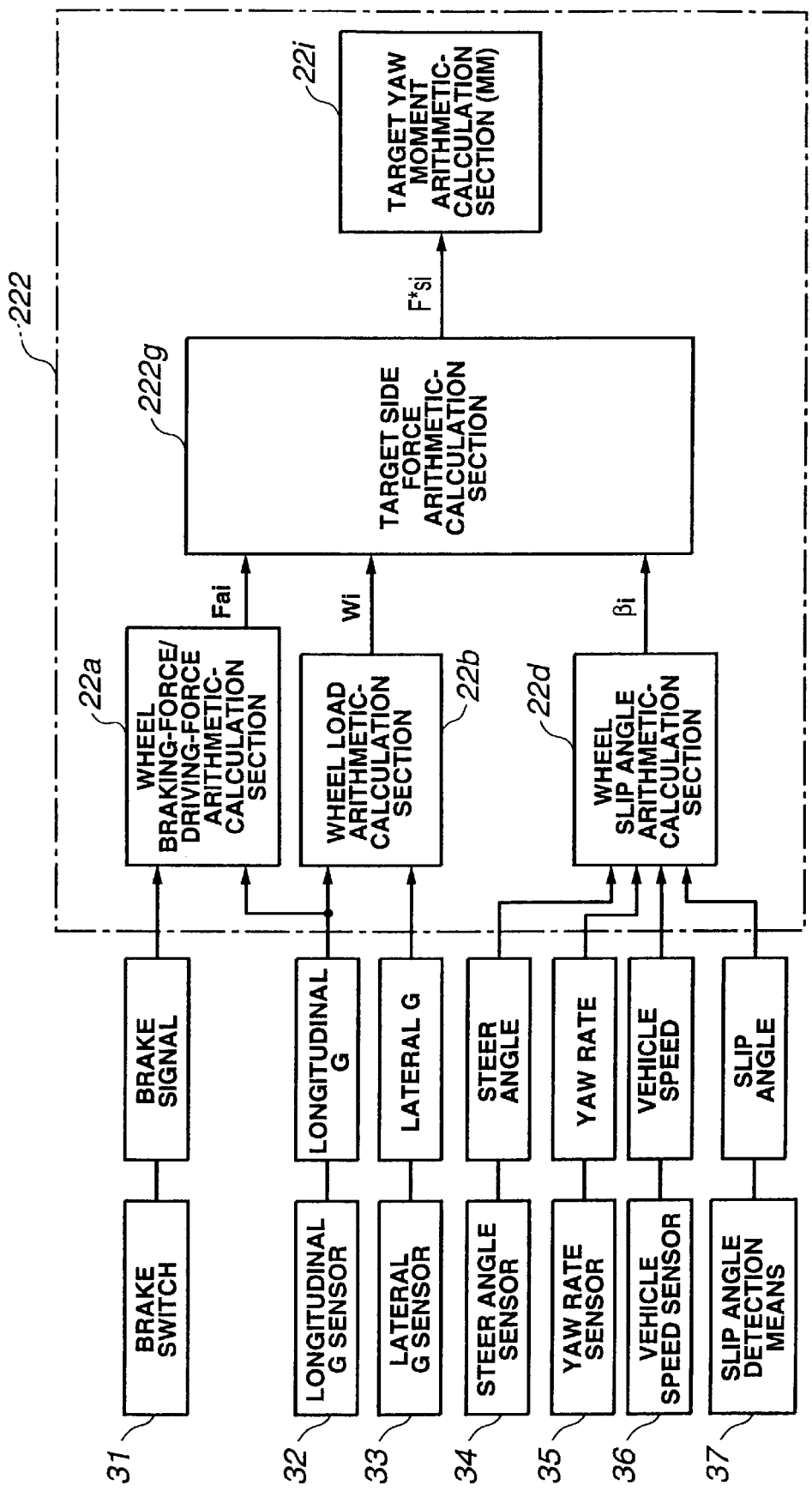
FIG. 16 is a block diagram illustrating a target yaw moment arithmetic-calculation means of the second embodiment.

FIG. 16 shows the target yaw moment arithmetic-calculation means 222 of the second embodiment. The output signals from the wheel braking-force/driving-force arithmetic-calculation section 22a, the wheel load arithmetic-calculation section 22b, and the wheel slip arithmetic-calculation section 22d are input into a target side force arithmetic-calculation section 222g. That is, the target side force arithmetic-calculation section 222g stores the following arithmetic expression need to arithmetically calculate a target side force $F^\times si$ of the tire.

$$F^\times si = (Limit[\gamma^\times i - (\gamma^\times i^2/3) + (\gamma^\times i^3/27) + (A\beta i)][(\mu Wi)^2 - BFai^2]^{1/2}$$

where $\gamma^\times i = |(K^\times c/\mu Wi) \tan \beta i|$, and $K^\times c$ denotes a corrected cornering stiffness, B denotes a longitudinal force correction factor.

Figure 17:
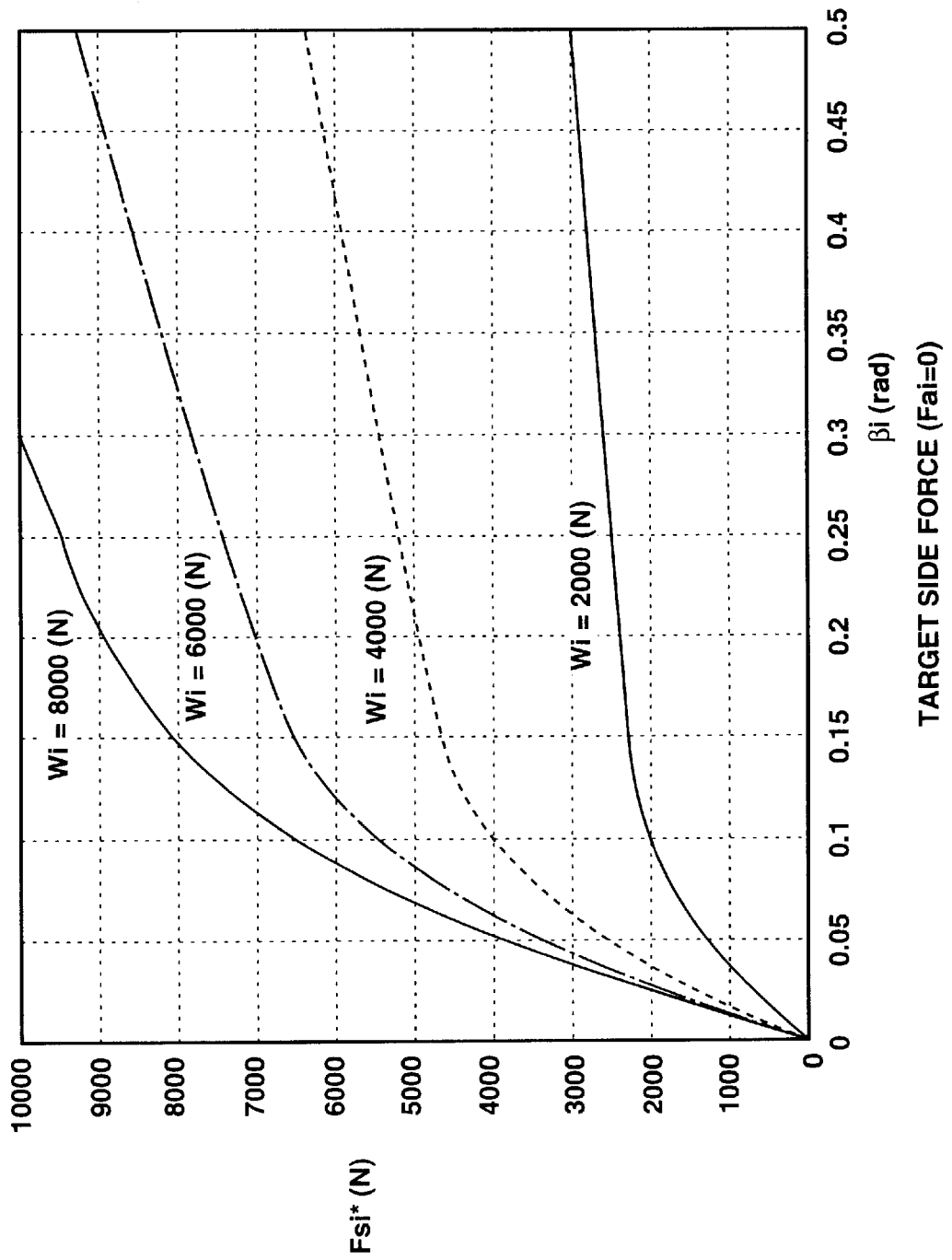
FIG. 17 is a target side force characteristic diagram of the second embodiment.

FIG. 17 is the characteristic diagram illustrating the relationship among the wheel load Wi, the wheel slip angle $\beta i$, and the target side force $F^\times si$.

Therefore, the target side force arithmetic-calculation section 222g receives the braking-force/driving-force Fai, the wheel load Wi, and the wheel slip angle βi of each road wheel, and then arithmetically calculates the target side force $F^{\times}si$ by way of the previously-described arithmetic expression. On the other hand, the target yaw moment arithmetic-calculation means 222i calculates the target yaw moment MM on the basis of the target side force $F^{\times}si$.

The system of the second embodiment is constructed so that the actual side force and the target side force are calculated by way of the respective arithmetic expressions, thus reducing arithmetic load of the yaw control, and also reducing CPU costs. This results in manufacturing costs reduction.

Third Embodiment

Figure 18:
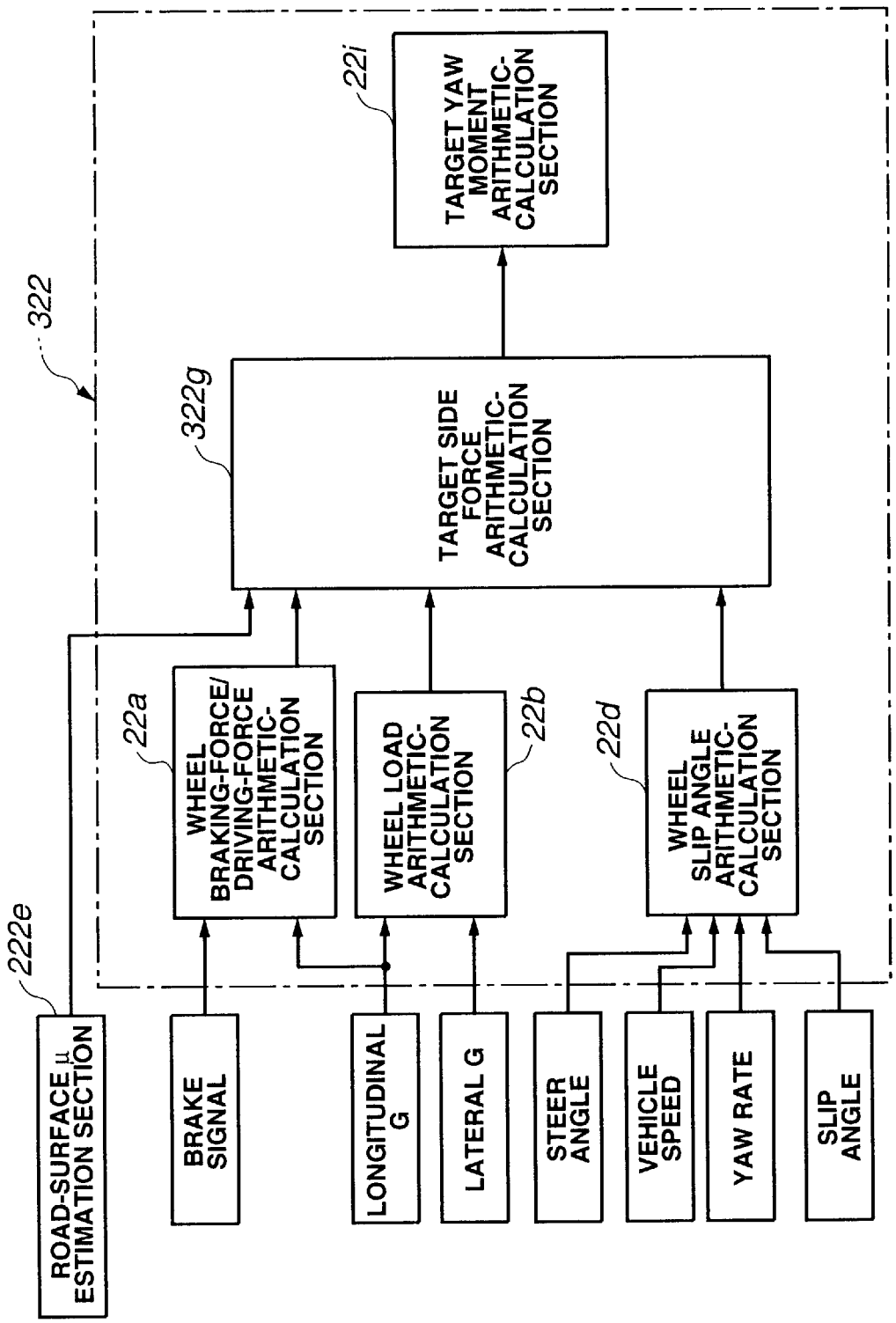
FIG. 18 is a block diagram illustrating a target yaw moment arithmetic-calculation means of a third embodiment.
Figure 19:
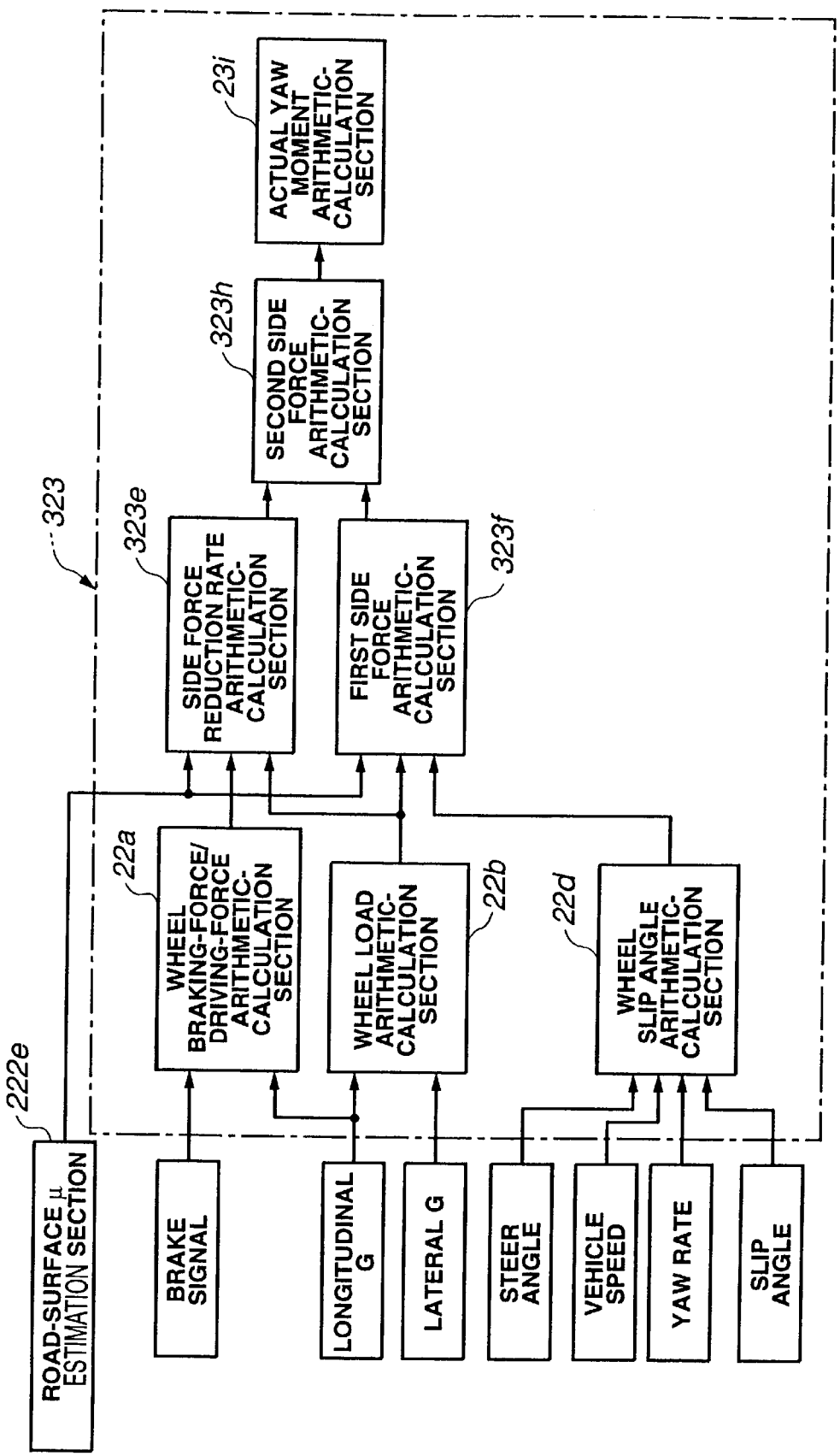
FIG. 19 is a block diagram illustrating an actual yaw moment detection means of the third embodiment.

The third embodiment corresponds to a modification of the embodiment shown in FIGS. 9 and 10. Briefly explaining on a point of difference between these embodiments, the system of the third embodiment is constructed, so that the output of the road-surface μ estimation section 222e is input into a target side force arithmetic-calculation section 322g of a target yaw moment arithmetic-calculation section 322 (see FIG. 18), and so that the output of the road-surface estimation section 222e is input into both the side force reduction rate arithmetic-calculation section 323e and the first side force arithmetic-calculation section 323f of the actual yaw moment detection means 323.

Figure 20:
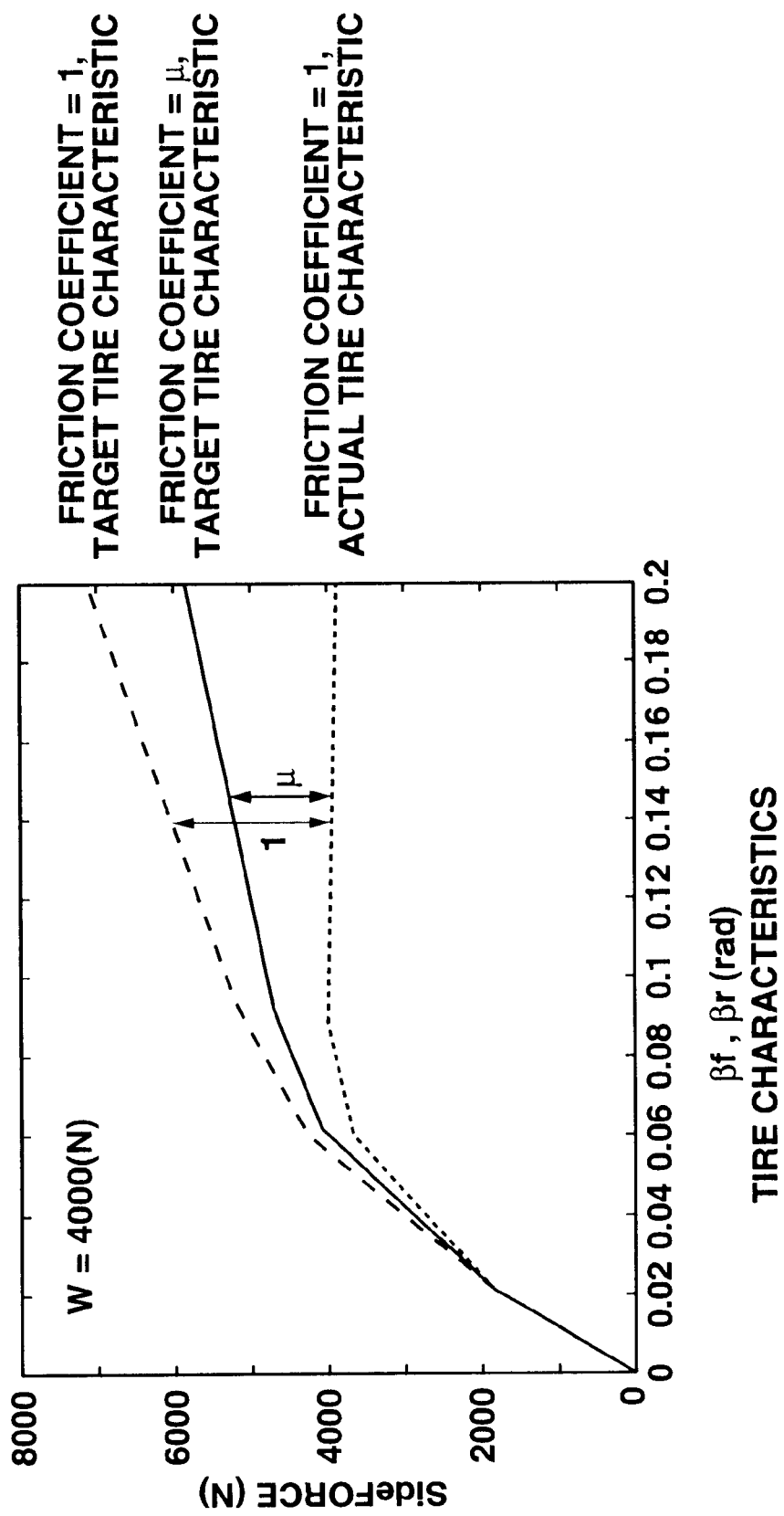
FIG. 20 is a target side force characteristic diagram of the third embodiment.

In the same manner as the first embodiment, the target side force arithmetic-calculation section 322g of the system of the third embodiment, arithmetically calculates or retrieves a tire characteristic preset under a condition of μ=1 and an actual tire characteristic given under a condition of μ=1, both tire characteristics indicated by the broken lines in FIG. 20. Furthermore, the target side force arithmetic-calculation section selects a target tire characteristic depending on the road surface μ, by multiplying the difference of the preset tire characteristic and the actual tire characteristic with the rod surface μ based on the output of the road surface estimation section 222e, and by adding the multiplied value to the actual tire characteristic. On the basis of the target tire characteristic selected, a target side force $F^{\times}si$ is arithmetically calculated or retrieved. A target yaw moment MM is arithmetically calculated from the target side force $F^{\times}si$ retrieved.

Figure 21:
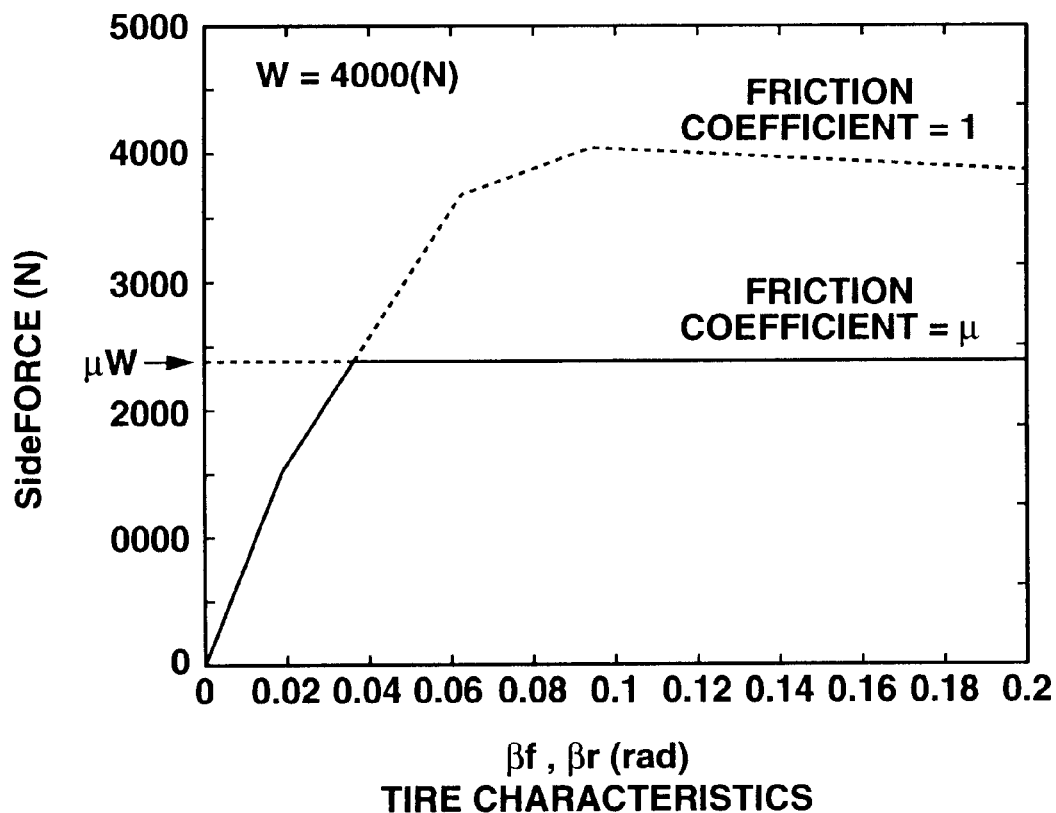
FIG. 21 is an actual side force characteristic diagram of the third embodiment.

On the other hand, within the actual yaw moment detection means 323, the second side force arithmetic-calculation section 323h finally determines a tire characteristic depending on the output of the road surface μ estimation section 222e, as seen from the tire characteristic curve shown in FIG. 21. On the basis of the final tire characteristic determined, an actual side force Fsi is arithmetically calculated or retrieved. An actual yaw moment M is arithmetically calculated from the actual side force Fsi retrieved.

As discussed above, according to the third embodiment, the road surface μ is estimated, and then the target side force $F^{\times}si$ and the actual side force Fsi are arithmetically calculated or retrieved depending on the road surface μ. Thereafter, on the basis of the target side force and actual side force retrieved, the actual yaw moment M and the target yaw moment MM are arithmetically calculated. This enhances the accuracy of estimation for both the actual yaw moment M and the target yaw moment MM, thus enhancing the quality of yaw control.

Moreover, the road surface μ estimation section 222e is designed to estimate the road surface μ by way of arithmetic calculation. That is, the estimation section can be constructed as a low-cost arithmetic-calculation means.

As explained above, the system of the present invention is constructed by an actual yaw moment detection means which detects an actual yaw moment, a target yaw moment arithmetic-calculation means which arithmetically calculates a target yaw moment based on the vehicle behavior, and an operating command means which operates a yaw moment generating mechanism so that a yaw moment corresponding to the difference between the target yaw moment and the actual yaw moment, and thus there is less control delay, which delay may occur during yaw control based on a yaw rate, and also there is less control hunting. Therefore, there is less possibility that the driver feels uncomfortable during the yaw control. As a consequence, the system of the invention provides such an effect that the quality of yaw control is enhanced.

According to the invention, in determining a target yaw moment, the system is constructed so that the target yaw moment is arithmetically calculated on the basis of the target tire characteristic and also depending on a quantity of state of each of the road wheels. Thus, it is possible to provide a high cornering performance based on an ideal tire characteristic by performing the yaw moment control utilizing the ideal tire characteristic as the target tire characteristic.

According to another aspect of the invention, the actual yaw moment detection means is constructed by a tire quantity-of-state estimation means which estimates a quantity of state of each of tires of the road wheels on the basis of the input from the vehicle behavior detection means, and an arithmetic-calculation means which arithmetically calculates a yaw moment of the vehicle from the quantity of state of each of the tires. Thus, the system has an additional effect that it is possible to derive a yaw moment of the vehicle by way of a cheaper means containing the existing sensors, in comparison with a case where a yaw moment of the vehicle is sensed by means of load sensors attached to the respective road wheels. In particular, according to the invention, the tire quantity-of-state estimation means includes the side force arithmetic-calculation means which arithmetically calculates a side force acting on each of the road wheels, and also an actual yaw moment is calculated on the basis of the side force acting on each of the road wheels. The system is not expensive, but has an effect that it is possible to accurately detect the yaw moment varying continually.

Additionally, according to another aspect of the invention, in the system as claimed in claims 6 or 10, in determining a slip angle of the center of gravity of the vehicle by the wheel slip angle arithmetic-calculation means, an arithmetic expression which directly estimates a cornering power of the tire is used, and thus it is unnecessary to store the past time-series data memorized for a predetermined period of time, and also it is possible to accurately estimate the slip angle even in the presence of rapid changes in the road surface conditions. The system has various effects, namely a cheap system, reduced memory capacity, and high-accuracy arithmetic-calculation of the slip angle. In particular, according to the invention, it is possible to simplify the construction of the system, while ensuring its reliability.

Also, according to another aspect of the invention, the target yaw moment arithmetic-calculation means and the actual yaw moment arithmetic-calculation means respectively calculate a target side force and an actual side force, on the basis of the quantity of state of each of the road wheels and the tire characteristic stored or written in the form of an arithmetic expression, and thus it is possible to reduce the arithmetic-calculation load during the yaw control. This reduces a price of a central processing unit (CPU) used in the system, and consequently reduces production costs.

According to another aspect of the invention, the system is constructed so that the result of arithmetic-calculation of at least one of the actual yaw moment and the target yaw moment is varied depending on a road surface friction coefficient, thus enhancing the control quality.

In addition, according to another aspect of the invention, the road surface friction coefficient is derived on the basis of a slip rate of the drive wheel, a longitudinal acceleration exerted on the vehicle, and a constant, and thus it is possible to derive the road surface $\mu$ by way of a simple arithmetic calculation, thereby attaining low production costs and high control quality.

What is claimed is:

1. A vehicle yaw dynamics control system comprising:

a yaw moment generating mechanism which produces a yawing motion at a vehicle;

a vehicle behavior detection section which detects a vehicle behavior;

an actual yaw moment detection section which is included in said vehicle behavior detection section and detects an actual yaw moment acting on the vehicle;

a target yaw moment arithmetic-calculation section which arithmetically calculates a target yaw moment necessary for a current vehicle behavior on the basis of an input from said vehicle behavior detection section, the target yaw moment arithmetic-calculation section comprising a calculation section that arithmetically calculates the target yaw moment by (i) a quantity of state of each of the road wheels and (ii) a predetermined target tire characteristic wherein a side force increases as a slip angle increases; and an operating command section that operates said yaw moment generating mechanism to output a yaw moment equivalent to the difference between the target yaw moment and the actual yaw moment.

2. The vehicle yaw dynamics control system as claimed in claim 1, wherein said vehicle behavior detection section comprises a side-force plus longitudinal-force detection section which detects a side force acting on each of road wheels and a longitudinal force acting on each of the road wheels, and said actual yaw moment detection section comprises a calculation section arithmetically calculating the actual yaw moment on the basis of an input from the side-force plus longitudinal-force detection section.

3. The vehicle yaw dynamics control system as claimed in claim 1, wherein said vehicle behavior detection section comprises a yaw rate sensor which detects a yaw rate of the vehicle, and said actual yaw moment detection section comprises a calculation section arithmetically calculating the actual yaw moment by multiplying a differentiated value of the yaw rate detected with a yaw moment of inertia of the vehicle.

4. The vehicle yaw dynamics control system as claimed in claim 1, wherein said target yaw moment arithmetic-calculation section comprises a wheel load arithmetic-calculation section which arithmetically calculates a wheel load of each of the road wheels, a wheel slip angle arithmetic-calculation section which arithmetically calculates a slip angle of each of the road wheels, and a wheel braking-force/driving-force arithmetic-calculation section which arithmetically calculates a wheel braking-force/driving-force, and the quantity of state of each of the road wheels comprises a wheel load, a slip angle, and a braking-force/driving-force.

5. The vehicle yaw dynamics control system as claimed in claim 1, wherein said target yaw moment arithmetic-calculation section comprises a load-transfer arithmetic-calculation section arithmetically calculating a load transfer based on lateral acceleration, a slip-angle arithmetic-calculation section arithmetically calculating a slip angle of each of the road wheels, and an arithmetic-calculation section arithmetically calculating a target side force by only the load transfer and the slip angle of each of the road wheels, from the predetermined target tire characteristic, and arithmetically calculating the target yaw moment on the basis of the target side force.

6. The vehicle yaw dynamics control system as claimed in claim 1, wherein said actual yaw moment detection section comprises a tire quantity-of-state estimation estimating a quantity of state of each of tires of the road wheels, and an arithmetic-calculation section arithmetically calculating the yaw moment of the vehicle by an output from the tire quantity-of-state estimation section.

7. The vehicle yaw dynamics control system as claimed in claim 6, wherein said vehicle behavior detection section comprises a lateral acceleration sensor, a longitudinal acceleration sensor, a brake sensor, a steer angle sensor, a yaw rate sensor, a vehicle speed sensor, and a vehicle slip angle detection section, and the tire quantity-of-state estimation section for each of tires of the road wheels includes a wheel slip angle arithmetic-calculation section arithmetically calculating a slip angle of each of the road wheels on the basis of a vehicle slip angle, a steer angle, a yaw rate, and a vehicle speed, a wheel load arithmetic-calculation section arithmetically calculating a wheel load of each of the road wheels on the basis of a longitudinal acceleration acting on the vehicle and a lateral acceleration acting on the vehicle, a braking-force/driving-force arithmetic-calculation section arithmetically calculating a braking-force/driving-force acting on each of the road wheels on the basis of a braking condition and the longitudinal acceleration acting on the vehicle, and a side force arithmetic-calculation section arithmetically calculating a side force on the basis of the wheel load of each of the road wheels, the braking-force/driving-force acting on each of the road wheels, and the slip angle of each of the road wheels, which are obtained by way of the wheel load arithmetic-calculation section, the braking-force/driving-force arithmetic-calculation section, and the wheel slip angle arithmetic-calculation section.

8. The vehicle yaw dynamics control system as claimed in claim 7, wherein said side force arithmetic-calculation section comprises a retrieval section for retrieving a side force acting on each of the road wheels on the basis of the wheel load and the slip angle except the braking-force/driving-force, from a preset characteristic map, a calculation section arithmetically calculating a side-force reduction rate on the basis of the braking-force/driving-force, and a calculation section arithmetically calculating the side force of each of the road wheels on the basis of the side force retrieved and the side-force reduction rate except the braking-force/driving-force.

9. The vehicle yaw dynamics control system as claimed in claim 8, wherein said wheel slip angle arithmetic-calculation section is constructed so that the slip angle of each of the road wheels is arithmetically calculated after a slip angle of the center of gravity of the vehicle is calculated, and so that, in calculating the slip angle of the center of gravity of the vehicle, the wheel slip angle arithmetic-calculation section comprises an arithmetic-calculation arithmetically calculating, first, a cornering-power estimate $PC_2$ of a rear wheel of the road wheels on the basis of signals from the sensors, namely a yaw-rate indicative signal $\Delta\psi$, a lateral acceleration indicative signal $\Delta\Delta Y$, and a vehicle speed indicative signal V, from the following expression (1);

$$PC_2=(V/L)(ma\Delta\Delta Y-I\Delta\psi s)/[\Delta\psi(bs+V)-\Delta\Delta Y]+f(\Delta\Delta Y) \quad (1)$$

where s denotes a Laplace operator, m denotes a mass of the vehicle, a denotes a longitudinal distance from the center of gravity of the vehicle to a front-wheel axle, b denotes a longitudinal distance from the center of gravity of the vehicle to a rear-wheel axle, L denotes a wheel base, I denotes a moment of inertia of the vehicle, a first term of the right side of the expression is a rear-wheel cornering power calculated analytically from a two-wheel model of the vehicle, and a second term $f(\Delta\Delta Y)$ is a correction term based on the lateral acceleration, and so that, second, the arithmetic-calculation section arithmetically calculates a slip angle $\beta$ by the rear-wheel cornering power estimate $PC_2$ and the yaw rate indicative signal $\Delta\psi$, from the following expression (2) representative of the relationship between the yaw rate calculated analytically from a two-wheel model of the vehicle, and the slip angle;

$$\beta=-K_{br}[(T_b s+1)/(T_r s+1)]\Delta\psi \quad (2)$$

where $K_{br}=(1-(ma/(LbPC_2))V^2)(b/V)$, $T_b=IV/(LbPC_2-maV^2)$, and $T_r=[ma/LPC_2]V$.

10. The vehicle yaw dynamics control system as claimed in claim 8, wherein said wheel slip angle arithmetic-calculation section is constructed so that the slip angle of each of the road wheels is arithmetically calculated after a slip angle of the center of gravity of the vehicle is calculated, and so that, in calculating the slip angle of the center of gravity of the vehicle, the wheel slip angle arithmetic-calculation section comprises an arithmetic-calculation section for arithmetically calculating, first, a cornering-power estimate $PC_2$ of a rear wheel of the road wheels on the basis of signals from the sensors, namely a yaw-rate indicative signal $\Delta\psi$, a lateral acceleration indicative signal $\Delta\Delta Y$, and a vehicle speed indicative signal V, from the following expression (5);

$$PC_2=(V/C)(ma\Delta\Delta Y-I\Delta\psi s)/[\Delta\psi(bs+V)-\Delta\Delta Y] \quad (5)$$

where s denotes a Laplace operator, m denotes a mass of the vehicle, a denotes a longitudinal distance from the center of gravity of the vehicle to a front-wheel axle, b denotes a longitudinal distance from the center of gravity of the vehicle to a rear-wheel axle, L denotes a wheel base, and I denotes a moment of inertia of the vehicle, and so that, second, the arithmetic-calculation section arithmetically calculates a slip angle $\beta$ by the rear-wheel cornering power estimate $PC_2$ and the yaw rate indicative signal $\Delta\psi_2$, from the following expression (6) representative of the relationship between the yaw rate calculated analytically from a two-wheel model of the vehicle, and the slip angle;

$$\beta=-K_{br}[(T_b s+1)/(T_r s+1)]\Delta\psi \quad (6)$$

where $K_{br}=(1-(ma/(LbPC_2))V^2)(b/V)$, $T_b=IV/(LbPC_2-maV^2)$, and $T_r=[ma/LPC_2]V$.

11. The vehicle yaw dynamics control system as claimed in claim 1, wherein said target yaw moment arithmetic-calculation section and said actual yaw moment arithmetic-calculation section respectively calculates the target side force and the actual side force, on the basis of the quantity of state of each of the road wheels and tire characteristics written as an arithmetic expression, and arithmetically calculates the target yaw moment from the target side force, and calculates the actual yaw moment from the actual side force.

12. The vehicle yaw dynamics control system as claimed in claim 11, wherein an arithmetic expression for arithmetic-calculation of the actual side force Fsi performed by the actual yaw moment arithmetic-calculation section is the following expression;

$$Fsi=\text{Limit}[\gamma i-(\gamma i^2/3)+(\gamma i^3/27)][(\mu Wi)^2-Fai^2]^{1/2}$$

and in said target yaw moment arithmetic-calculation section, an arithmetic expression for arithmetic-calculation of the target side force $F^{\times}si$ is the following expression;

$$F^{\times}si=\{\text{Limit}[\gamma^{\times}i-(\gamma^{\times}i^2/3)+(\gamma^{\times}i^3/27)]+A\beta i\}[(\mu Wi)^2-BFai^2]^{1/2}$$

where $\gamma i=|(Kc/\mu Wi)\tan\beta i|$, and the function Limit $[\gamma i-(\gamma i^2/3)+(\gamma i^3/27)]$ is a characteristic function that is saturated when a value within [ ] exceeds "1", and Wi denotes a wheel load of each road wheel, $\beta i$ denotes a side slip angle of each road wheel, Fai denotes a braking-force/driving-force, Kc denotes a cornering stiffness, $\mu$ denotes a friction coefficient between the tire and the road surface, A denotes a constant, and B denotes a longitudinal force correction factor, and also $$\gamma^{\times}i=|(K^{\times}c/\mu Wi)\tan\beta i|, \text{ and } K^{\times}$$

c denotes a cornering stiffness.

13. The vehicle yaw dynamics control system as claimed in claim 11, wherein an arithmetic expression for arithmetic-calculation of the actual side force Fsi performed by said actual yaw moment arithmetic-calculation section is the following expression;

$$Fsi=D\sin\{C\arctan[F-E(F-\arctan(F))]\}$$

where each of C, D, E, and F is a function of $\mu$, WI, and $\beta i$, and wherein an arithmetic expression for arithmetic-calculation of the target side force $F^{\times}si$ performed by said target yaw moment arithmetic-calculation section is the following expression;

$$F^{\times}si=D^{\times}\{\sin[C^{\times}\arctan[F^{\times}-E^{\times}(F^{\times}-\arctan(F^{\times}))]]+Z\beta i\}$$

where each of $C^{\times}$, $D^{\times}$, $E^{\times}$, and $F^{\times}$ is a function of $\mu$, Wi, and $\beta i$, and Z is a constant.

14. The vehicle yaw dynamics control system as claimed in claim 1, wherein a road-surface friction coefficient detection section is provided for detecting a road-surface friction coefficient, and said actual yaw moment arithmetic-calculation section is constructed so that arithmetic-calculation for the actual yaw moment is varied depending on the road surface friction coefficient.

15. The vehicle yaw dynamics control system as claimed in claim 1, wherein a road-surface friction coefficient detection section is provided for detecting a road-surface friction coefficient, and said target yaw moment arithmetic-calculation section is constructed so that arithmetic-calculation for the target yaw moment is varied depending on the road surface friction coefficient.

16. The vehicle yaw dynamics control system as claimed in claim 15, wherein the read surface friction coefficient detection section is constructed so that the road surface friction coefficient is estimated by a ratio of the longitudinal acceleration of the vehicle to the slip rate of a drive wheel.

17. The vehicle yaw dynamics control system as claimed in claim 16, wherein the road surface friction coefficient detection section is constructed so that the road surface friction coefficient $\mu$ is derived from the following arithmetic expression, on the assumption that the slip rate of the drive wheel is denoted by s, the tire stiffness is denoted by K, the driving force F is defined by an equation F=Ks, the longitudinal acceleration is denoted by Ax, and a weight of the vehicle is denoted by m;

$$\mu=(mAx/F)=(mAx/Ks).$$

18. The vehicle yaw dynamics control system as claimed in claim 1, wherein said target yaw moment arithmetic-calculation section comprises at least a wheel load arithmetic-calculation section which arithmetically calculates a wheel load of each of the road wheels and a wheel slip angle arithmetic-calculation section which arithmetically calculates the slip angle of each of the road wheels, and the side force of the predetermined get tire characteristic is increasingly compensated for, as the wheel load increases.

* * * * *